United States Patent
Singaraju et al.

(10) Patent No.: US 11,625,620 B2
(45) Date of Patent: Apr. 11, 2023

(54) TECHNIQUES FOR BUILDING A KNOWLEDGE GRAPH IN LIMITED KNOWLEDGE DOMAINS

(71) Applicant: Oracle International Corporation, Redwood Shores, CA (US)

(72) Inventors: Gautam Singaraju, Dublin, CA (US); Prithviraj Venkata Ammanabrolu, Atlanta, GA (US)

(73) Assignee: Oracle International Corporation, Redwood Shores, CA (US)

( * ) Notice: Subject to any disclaimer, the term of this patent is extended or adjusted under 35 U.S.C. 154(b) by 522 days.

(21) Appl. No.: 16/542,017

(22) Filed: Aug. 15, 2019

(65) Prior Publication Data

US 2020/0057946 A1 Feb. 20, 2020

Related U.S. Application Data

(60) Provisional application No. 62/765,005, filed on Aug. 16, 2018.

(51) Int. Cl.
  *G06N 20/00* (2019.01)
  *G06N 5/025* (2023.01)
  *G06N 5/04* (2023.01)

(52) U.S. Cl.
  CPC ............ *G06N 5/025* (2013.01); *G06N 5/041* (2013.01); *G06N 20/00* (2019.01)

(58) Field of Classification Search
  CPC ......... G06N 5/025; G06N 20/00; G06N 5/041
  See application file for complete search history.

(56) References Cited

U.S. PATENT DOCUMENTS

| 2014/0297644 A1* | 10/2014 | Cheng | G06F 16/355 |
| | | | 707/737 |
| 2016/0247087 A1* | 8/2016 | Nassar | G06F 16/322 |
| 2018/0075359 A1 | 3/2018 | Brennan et al. | |
| 2018/0196796 A1* | 7/2018 | Wu | G06F 40/289 |

OTHER PUBLICATIONS

KertKeidKachorn, N. et al, An Automatic Knowledge Graph Creation Framework from Natural Language Text, [retrieved Sep. 30, 2021], Retrieved from Internet:<https://search.ieice.org/bin/summary.php?id=e101-d_1_90> (Year: 2018).*

(Continued)

*Primary Examiner* — Shane D Woolwine
*Assistant Examiner* — Bart I Rylander
(74) *Attorney, Agent, or Firm* — Kilpatrick Townsend & Stockton LLP

(57) ABSTRACT

Techniques disclosed herein relate generally to constructing a customized knowledge graph. In one embodiment, entities and relations among entities are extracted from a user dataset based on certain rules to generate a seed graph. Large-scale knowledge graphs are then traversed using a finite state machine to identify candidate entities and/or relations to add to the seed graph. A priority function is used to select entities and/or relations from the candidate entities and/or relations. The selected entities and/or relations are then added to the seed graph to generate the customized knowledge graph.

19 Claims, 12 Drawing Sheets

(56) References Cited

OTHER PUBLICATIONS

Li, X. et al, Personal Knowledge Graph Population From User Utterances in Conversational Understanding, [retrieved Sep. 30, 2021]. Retrieved from Internet:<https://ieeexplore.ieee.org/stamp/stamp.jsp?tp=&arnumber=7078578> (Year: 2014).*

Trani, S., et al, Dexter 2.0—an Open Source Tool for Semantically Enriching Data, [retrieved Sep. 30, 2021]. Retrieved from Internet:<https://citeseerx.ist.psu.edu/viewdoc/download?doi=10.1.1.659.2896&rep=rep1&type=pdf> (Year: 2014).*

Tur, D., et al, Using a Knowledge Graph and Query Click Logs for Unsupervised Learning of Relation Detection, [retrieved Sep. 30, 2021]. Retrieved from Internet:<https://ieeexplore.ieee.org/stamp/stamp.jsp?tp=&arnumber=6639289> (Year: 2013).*

Exner, P., et al, Entity extraction: From unstructured text to DBpedia RDF triples, [retrieved Sep. 30, 2021]. Retrieved from Internet:<https://portal.research.lu.se/portal/en/publications/entity-extraction-from-unstructured-text-to-dbpedia-rdf-triples(636681f3-82d6-46f2-bd70-76114b130c1a).html> (Year: 2012).*

Fulda, N., et al, BYU-EVE: Mixed Initiative Dialog via Structured Knowledge Graph Traversal and Conversational Scaffolding, [retrieved on Sep. 30, 2021]. Retrieved from Internet:<http://dex-microsites-prod.s3.amazonaws.com/alexaprize/2018/papers/Eve.pdf> (Year: 2018).*

Chen-Yen, C., et al., Gunrock: Building a Human-Like Social Bot by Leveraging Large Scale Real User Data, [retrieved on Sep. 30, 2021]. Retrieved from Internet:< http://dex-microsites-prod.s3.amazonaws.com/alexaprize/2018/papers/Gunrock.pdf>(Year: 2018).*

Wu, Y., et al., Knowledge Graph Embedding with Numeric Attributes of Entities, [retrieved on Sep. 30, 2021]. Retrieved from Internet:<https://aclanthology.org/W18-3017.pdf> (Year: 2018).*

Deng, L. et al., Deep learning in Natural Language Processing, [retrieved Oct. 4, 2021], Retrieved from Internet:<https://link.springer.com/book/10.1007%2F978-981-10-5209-5>(Year: 2017).*

Fan, Y. et al., DKGBuilder: An Architecture for Building a Domain Knowledge Graph from Scratch, [retrieved Oct. 4, 2021] Retrieved from Internet:<https://link.springer.com/chapter/10.1007/978-3-319-55699-4_42> (Year: 2017).*

Bothe, C. et al., Dialogue-based neural learning to estimate sentiment of next upcoming utterance, [retrieved on Oct. 4, 2021]. Retrieved from Internet:<https://www2.informatik.uni-hamburg.de/wtm/publications/2017/BMWW17/bothe_ICANN_prePrint_article.pdf> (Year: 2017).*

Li, X. et al, Personal knowledge Graph Population From User Utterances in Conversational Understanding, [received Jul. 22, 2022]. Retrieved from Internet:<https://ieeexplore.ieee.org/abstract/document/7078578/> (Year: 2015).*

Fano. H., et al, Soundino Board: A User-Centric and Content-Driven Social Chatbot, [received Jul. 22, 2022]. Retrieved from Internet:<https://arxiv.org/abs/1804.10202> (Year: 2018).*

Deng, L., et al, Deep Learning in Natural Language Processing, [received Jul. 22, 2022]. Retrieved from Internet:<https://link.springer.com/book/10.1007/978-981-10-5209-5> (Year: 2018).*

Fan, Y., et al, DKGBuilder: An Architecture for Building a Domain Knowledge Graph from Scratch, [received Jul. 22, 2022]. Retrieved from Internet:<https://link.springer.com/chapter/10.1007/978-3-319-55699-4_42> (Year: 2017).*

Trani, S., et al, Dexter 2.0—an Open Source Tool for Semantically Enriching Data, [received Jul. 22, 2022]. Retrieved from Internet:<chrome-extension://efaidnbmnnnibpcajpcglclefindmkaj/http://ceur-ws.org/Vol-1272/paper_127.pdf> (Year: 2014).*

Kertkeidkachorn, N., et al, An Automatic Knowledge Graph Creation Framework from Natural Language Text, [received Jul. 22, 2022]. Retrieved from Internet:<https://search.ieice.org/bin/summary.php?id=e101-d_1_90> (Year: 2017).*

Bothe, C., et al, Dialogue-based neural learning to estimate sentiment of next upcoming utterance, [received Jul. 22, 2022]. Retrieved from Internet:<https://link.springer.com/chapter/10.1007/978-3-319-68612-7_54> (Year: 2017).*

Fan et al., "DKGBuilder: An Architecture for Building a Domain Knowledge Graph from Scratch", International Conference on Database Systems for Advanced Applications,, 2017, pp. 663-667.

Hixon et al., "Learning Knowledge Graphs for Question Answering through Conversational Dialog", Proceedings of the 2015 Conference of the North American Chapter of the Association for Computational Linguistics: Human Language Technologies, 2015, pp. 851-861.

Zhao et al., "HDSKG: Harvesting Domain Specific Knowledge Graph from Content of Webpages", IEEE 24th International Conference on Software Analysis, Evolution and Reengineering (SANER), Feb. 2017, pp. 56-67.

International Patent Application No. PCT/US2019/046841, International Search Report and Written Opinion dated Nov. 25, 2019, 14 pages.

Backstrom et al., "Supervised Random Walks: Predicting and Recommending Links in Social Networks," Proceedings of the Fourth ACM International Conference on Web Search and Data Mining, ACM (2011), 10 pages.

Bordes et al., "Question Answering with Subgraph Embeddings," Empirical Methods in Natural Language Processing (EMNLP), Oct. 25-29, 2014, pp. 615-620.

Bordes et al., "Translating Embeddings for Modeling Multi-Relational Data," Advances in Neural Information Processing Systems, vol. 2, Dec. 2013, pp. 1-9.

Ceccarelli et al., "Dexter: an Open Source Framework for Entity Linking," Proceedings of the sixth international workshop on Exploiting semantic annotations in information retrieval, Oct. 2013, 3 pages.

Chen et al., "Neural Natural Language Inference Models Enhanced with External Knowledge," https://arxiv.org/pdf/1711.04289, Jun. 23, 2018, 12 pages.

Fan et al., "Transition-based Knowledge Graph Embedding with Relational Mapping Properties," in Proc. 28th Pacific Asia Conference on Language, Information Computer, 2014, pp. 328-337.

Finkel et al., "Incorporating Non-local Information into Information Extraction Systems by Gibbs Sampling," Proceedings of the 43rd Annual Meeting of the Association for Computational Linguistics (ACL 2005), 8 pages.

Goikoetxea et al., "Single or Multiple? Combining Word Representations Independently Learned from Text and WordNet," Proceedings of the Thirtieth AAAI Conference on Artificial Intelligence, Feb. 2016, pp. 2608-2614.

Manning et al., "The Stanford CoreNLP Natural Language Processing Toolkit," Proceedings of 52nd Annual Meeting of the Association for Computational Linguistics, Jan. 2014, pp. 55-60.

Nourani et al., "A Comparison of Simulated Annealing Cooling Strategies," Journal of Physics A: Mathematical and General, vol. 31, No. 41, Oct. 1998, pp. 8373-8385.

Parundekar, "Understanding 'Things' using Semantic Graph Classification," Apr. 2016, pp. 1-13.

Parundekar, "Understanding Things using Semantic Graph Classification," Available online at https://github.com/rparundekar/understanding-things-with-semantic-graph-classification, Accessed from internet at Jul. 27, 2018, 2 pages.

Paulheim, "Knowledge Graph Refinement: A Survey of Approaches and Evaluation Methods," Semantic Web, 2016, 23 pages.

Pennington et al., "GloVe: Global Vectors for Word Representation," Empirical Methods in Natural Language Processing (EMNLP), Jan. 2014, 12 pages.

Silva et al., "Building a Knowledge Graph from Natural Language Definitions for Interpretable Text Entailment Recognition," https://arxiv.org/abs/1806.07731, Jun. 20, 2018, 5 pages.

Toutanova et al., "Feature-Rich Part-of-Speech Tagging with a Cyclic Dependency Network," Proceedings of HLT-NAACL2003, 8 pages.

Vitter, "Random Sampling with a Reservoir," ACM Transactions on Mathematical Software, vol. 11, No. 1, Mar. 1985, pp. 37-57.

Trouillon et al., "Complex Embeddings for Simple Link Prediction," Proceedings of the 33rd International Conference on Machine Learning, vol. 48, Oct. 2016, 10 pages.

(56) References Cited

OTHER PUBLICATIONS

Trouillon et al., "Knowledge Graph Completion via Complex Tensor Factorization," Journal of Machine Learning Research, vol. 18, No. 130, Feb. 2017, 8 pages.
Tsuda et al., "Graph Classification," in Aggarwal et al. (eds) Managing and Mining Graph Data, Advances in Database Systems, vol. 40, 2010, pp. 337-363.
Vrandecic et al., "Wikidata: A Free Collaborative Knowledgebase," Communications of the ACM, vol. 57, No. 10, Oct. 2014, pp. 78-85.
Wang et al., "Knowledge Graph Embedding: A Survey of Approaches and Applications," IEEE Transactions on Knowledge and Data Engineering, vol. 29, Issue 12, Dec. 1, 2017, 20 pages.
Yih et al., "Semantic Parsing via Staged Query Graph Generation: Question Answering with Knowledge Base", Microsoft Research, Proceedings of the 53rd Annual Meeting of the Association for Computational Linguistics and the 7th International Joint Conference on Natural Language Processing, Jul. 26-31, 2015, pp. 1321-1331.
International Application No. PCT/US2019/046841, "International Preliminary Report on Patentability", dated Feb. 25, 2021, 10 pages.

\* cited by examiner

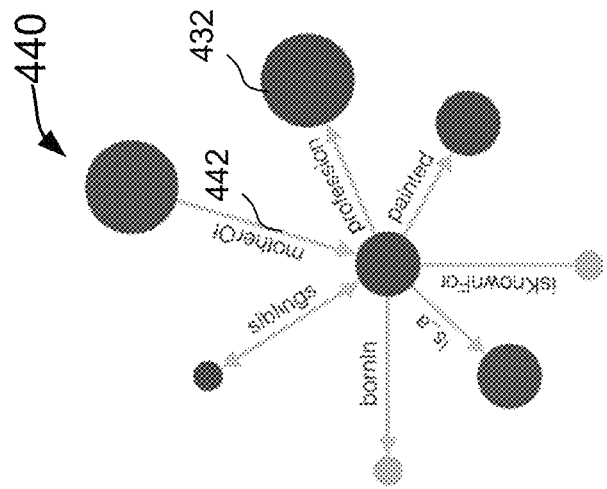
FIG. 4D
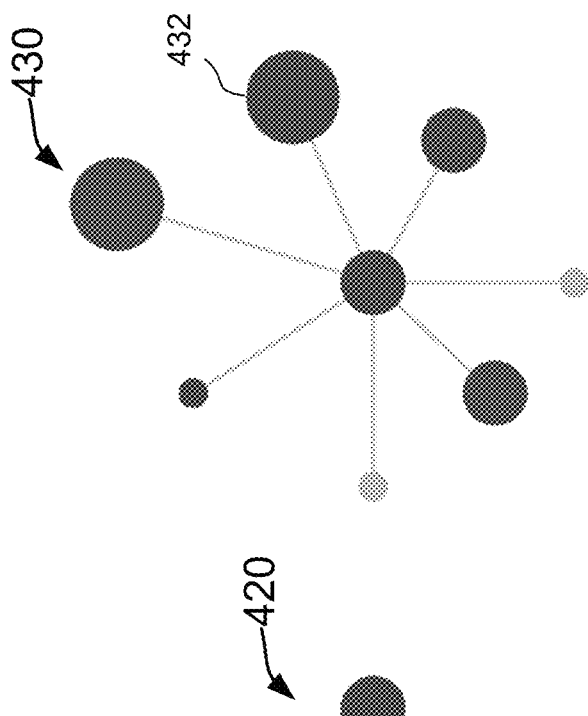
FIG. 4C
FIG. 4B
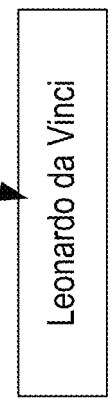
FIG. 4A

TECHNIQUES FOR BUILDING A KNOWLEDGE GRAPH IN LIMITED KNOWLEDGE DOMAINS

CROSS-REFERENCE TO RELATED APPLICATIONS

The present application claims the benefit of and priority to U.S. Provisional Patent Application No. 62/765,005, filed on Aug. 16, 2018, entitled "Techniques For Building A Knowledge Graph In Limited Knowledge Domains," which is herein incorporated by reference in its entirety for all purposes.

BACKGROUND

A knowledge graph organizes information in a structured way by explicitly describing the relations among entities. A knowledge graph generally represents knowledge bases using a directed graph with labeled edges (representing relations) between nodes or vertices (representing entities). Knowledge graphs can be used in, for example, searching, question answering, conversational interfaces (e.g., chatbots), recommender systems, etc. There are some large-scale and comprehensive knowledge graphs available. However, natural language understanding (NLU) services used for specific applications or environments, such as building conversational interfaces (e.g., chatbots) for different users, generally perform better within a specific domain. Creating an accurate knowledge graph for a specific knowledge domain is a challenging task in part due to the subtleties and ambiguity of natural languages and the limited knowledge in the specific domain because the number of samples in the user dataset is generally small.

BRIEF SUMMARY

The present disclosure relates generally to building customized knowledge graphs, and more particularly, to techniques for constructing a customized knowledge graph for a specific knowledge domain (e.g., for a specific client or a specific bot) based on a small user dataset and large-scale reference (e.g., external) knowledge graphs. The customized knowledge graph may be used to, for example, improve intent classification in a chatbot based on knowledge graph embedding techniques. Various inventive embodiments are described herein, including methods, systems, non-transitory computer-readable storage media storing programs, code, or instructions executable by one or more processors, and the like.

In certain embodiments, a computer-implemented method for generating a customized knowledge graph for an application is disclosed. The method may include receiving a user dataset for the application, extracting entities from the user dataset, identifying links between the entities based on the user dataset, and creating a seed graph that represents the entities and the links between the entities. The method may also include identifying weakly connected components in the seed graph, and, for each weakly connected component in the seed graph, mapping entities in the weakly connected component to vertices in a reference knowledge graph, traversing, from the mapped vertices in the reference knowledge graph and based on a finite state machine, the reference knowledge graph to identify up to a first threshold number of entities in the reference knowledge graph, and saving resource description frameworks (RDFs) for the identified entities as entries in a buffer. The method may further include computing priority scores for the entries in the buffer, selecting a first set of entries having the highest priority scores from the entries in the buffer, and adding entities and links identified by the first set of entries to the seed graph to generate a version of the customized knowledge graph.

In some embodiments, the user dataset may include a plurality of user utterances. Extracting the entities and identifying the links between the entities may include, for example, performing part-of-speech tagging, named-entity recognition, and/or constituency parsing on the user dataset. Mapping the entities in the weakly connected component to the vertices in the reference knowledge graph may include mapping the entities to the vertices in the reference knowledge graph using, for example, Dexter 2.

In some embodiments, the finite state machine may include a disambiguation state, an entity state, a forbidden state, and an end state. Traversing the reference knowledge graph may include: when a next vertex in the reference knowledge graph is a disambiguation vertex, entering the disambiguation state; when the next vertex in the reference knowledge graph is a forbidden vertex and if a current state of the finite state machine is not the forbidden state, entering the forbidden state; when the next vertex in the reference knowledge graph is an entity vertex, entering the entity state and saving RDF of the next vertex in the reference knowledge graph as an entry in the buffer; and when a number of entries in the buffer is greater than a second threshold number, entering the end state. The forbidden vertex may include, for example, a date, a time value, a link to another reference knowledge graph, a web page, or a duplicated or redirected entity.

In some embodiments, the priority score for an entry in the buffer may be determined using a priority function that is a function of a number of weakly connected components in a knowledge graph including the seed graph and the entity associated with the entry, a graph density of the knowledge graph including the seed graph and the entity associated with the entry, and/or a control parameter. In some embodiments, the method may also include, before computing the priority scores for the entries in the buffer, performing reservoir sampling on the entries in the buffer to reduce a number of the entries in the buffer.

In some embodiments, the method may also include updating the control parameter after adding the entities and links identified in the first set of entries to the seed graph. Updating the control parameter may include multiplying the control parameter with a value less than 1. In some embodiments, the method may further include, for each weakly connected component in the version of the customized knowledge graph, mapping entities in the weakly connected component to vertices in the reference knowledge graph, traversing, from the mapped vertices in the reference knowledge graph and based on the finite state machine, the reference knowledge graph to identify up to the first threshold number of entities in the reference knowledge graph, and saving RDFs for the identified entities as entries in the buffer. The method may also include computing priority scores for the entries in the buffer using the priority function and the updated control parameter, selecting a second set of entries having the highest priority scores from the entries in the buffer, and adding entities and links identified by the second set of entries to the seed graph to generate an updated customized knowledge graph.

In some embodiments, the method may also include, receiving an input utterance, extracting entities from the input utterance, generating knowledge graph embeddings for the extracted entities based on the customized knowledge graph, and classifying the input utterance based on the knowledge graph embeddings for the extracted entities. In some embodiments, generating the knowledge graph embeddings may include generating the knowledge graph embeddings using TransE or an extension of TransE. In some embodiments, generating the knowledge graph embeddings may include generating the knowledge graph embeddings using TransE and a weighted scoring function. In some embodiments, generating the knowledge graph embeddings may include pretraining the knowledge graph embeddings for the entities extracted from the input utterance using the reference knowledge graph, and retraining the knowledge graph embeddings for the entities extracted from the input utterance using the customized knowledge graph and the pretrained knowledge graph embeddings.

In some embodiments, classifying the input utterance based on the knowledge graph embeddings for the extracted entities may include determining an average knowledge graph embedding of the knowledge graph embeddings for the extracted entities, determining an average GloVe vector of GloVe vectors for words in the input utterance, and classifying the input utterance based on the average knowledge graph embedding and the average GloVe vector. In some embodiments, classifying the input utterance based on the average knowledge graph embedding and the average GloVe vector may include combining the average knowledge graph embedding and the average GloVe vector to generate a concatenated vector, performing principal component analysis on the concatenated vector, and classing the input utterance based on the principal component analysis. In some embodiments, determining the average GloVe vector of GloVe vectors for words in the input utterance may include cleaning the input utterance, generating a GloVe vector for each word in the cleaned input utterance, and averaging the GloVe vector for each word in the cleaned input utterance.

According to certain embodiments, a non-transitory computer readable medium may store a plurality of instructions executable by one or more processors, where the plurality of instructions, when executed by the one or more processors, may cause the one or more processors to perform processing including receiving a user dataset for the application, extracting entities from the user dataset, identifying links between the entities based on the user dataset, and creating a seed graph that represents the entities and the links between the entities. The processing may also include identifying weakly connected components in the seed graph, and, for each weakly connected component in the seed graph, mapping entities in the weakly connected component to vertices in a reference knowledge graph, traversing, from the mapped vertices in the reference knowledge graph and based on a finite state machine, the reference knowledge graph to identify up to a first threshold number of entities in the reference knowledge graph, and saving resource description frameworks (RDFs) for the identified entities as entries in a buffer. The processing may further include computing priority scores for the entries in the buffer, selecting a first set of entries having the highest priority scores from the entries in the buffer, and adding entities and links identified by the first set of entries to the seed graph to generate a version of the customized knowledge graph.

According to certain embodiments, a system may include one or more processors and a memory coupled to the one or more processors. The memory may store instructions, which, when executed by the one or more processors, may cause the system to perform operations including receiving a user dataset for the application, extracting entities from the user dataset, identifying links between the entities based on the user dataset, and creating a seed graph that represents the entities and the links between the entities. The operations may also include identifying weakly connected components in the seed graph, and, for each weakly connected component in the seed graph, mapping entities in the weakly connected component to vertices in a reference knowledge graph, traversing, from the mapped vertices in the reference knowledge graph and based on a finite state machine, the reference knowledge graph to identify up to a first threshold number of entities in the reference knowledge graph, and saving resource description frameworks (RDFs) for the identified entities as entries in a buffer. The operations may further include computing priority scores for the entries in the buffer, selecting a first set of entries having the highest priority scores from the entries in the buffer, and adding entities and links identified by the first set of entries to the seed graph to generate a version of the customized knowledge graph.

The foregoing, together with other features and embodiments will become more apparent upon referring to the following specification, claims, and accompanying drawings.

BRIEF DESCRIPTION OF THE DRAWINGS

Illustrative examples are described in detail below with reference to the following figures.

FIGS. 4A-4D illustrate an example of a process of building a knowledge graph.

DETAILED DESCRIPTION

Figure 1:
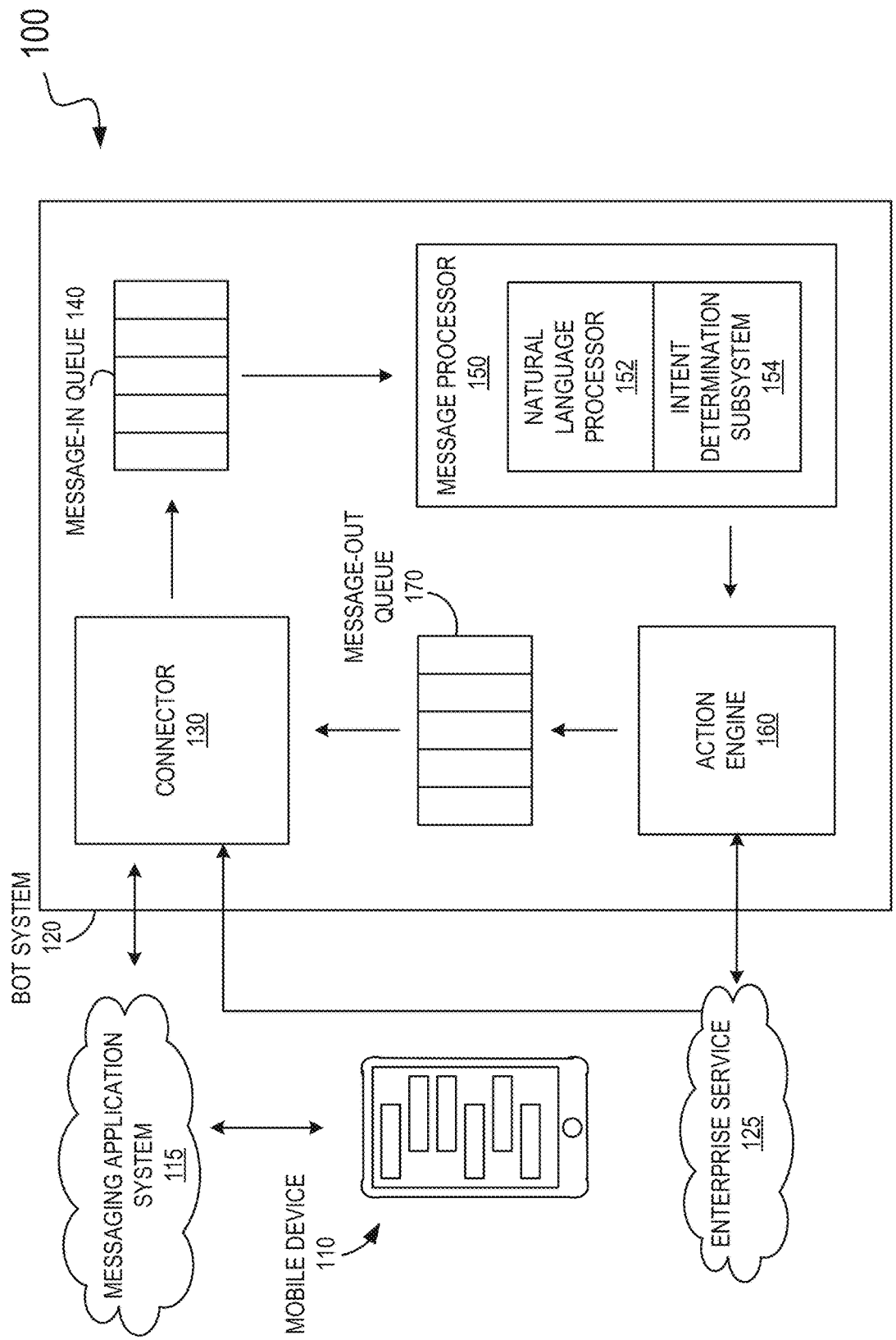
FIG. 1 depicts a distributed system that implements a bot system for communicating with end users using a messaging application according to certain embodiments.

The present disclosure generally relates to building customized knowledge graphs, and more particularly, to techniques for constructing a customized knowledge graph for a specific knowledge domain using limited knowledge in the domain (e.g., a small user dataset) and large-scale reference (e.g., external) knowledge graphs. The customized knowledge graph is used to, for example, improve intent classification in chatbots based on knowledge graph embedding techniques. Various inventive embodiments are described herein, including methods, systems, non-transitory computer-readable storage media storing programs, code, or instructions executable by one or more processors, and the like.

Natural language understanding (NLU) services used for specific applications or environments, such as conversational interfaces (e.g., chatbots) for different users, may perform better using a customized knowledge graph within a specific domain rather than a large, comprehensive knowledge graph. For example, there may be less noise in the customized knowledge graph, and thus it may be more efficient and more accurate to use a small customized knowledge graph rather than a large general-purpose knowledge graph. However, the available knowledge in the specific domain may be limited and thus the customized knowledge graph generated based on the limited knowledge may be sparse.

According to some embodiments, entities can be extracted from the small user dataset (including, e.g., user utterances, intents, entities, and QnAs) for a custom application (e.g., a chatbot) based on certain rules. A seed graph can be generated based on the extracted entities and connections or relations between the entities. Large-scale reference knowledge graphs, such as WikiData, can then be traversed using a finite state machine to identify candidate entities and/or relations to be added to the seed graph to expand the seed graph into a customized knowledge graph for the custom application. The traversal may also help to identify possible additional relations between entities in the user dataset and relevant facts from the reference knowledge graph. A scoring function may be used to select entities and/or relations from the identified entities and relations, and the selected entities and/or relations may then be added to the seed graph to generate the customized knowledge graph. The generated customized knowledge graph can be used for the customer application, such as a custom chatbot, using certain knowledge graph embedding techniques. An ablation study shows that the additional semantic information captured by the customized knowledge graph can improve the performance of custom chatbots. The techniques disclosed herein can also be used in other applications, such as question answering or relation extraction.

As used herein, a "chatbot," "bot," or "skill" refers to a computer program designed to simulate conversation with human users, especially over the Internet. Individual skills may be designed to interact with users and fulfill specific types of tasks, such as ordering food, making reservations, and changing contact information. Each skill may help a user complete a task through a combination of text messages and simple UI elements like select lists.

As used herein, the term "intents" may refer to categories of actions or tasks users expect a skill to perform for them. The term "entities" may refer to variables that identify key information from user input that enable the skill to fulfill a task. The term "components" may refer to various functions a skill can use to respond to users. The term "components" may refer to generic functions, such as outputting text, or returning information from a backend and performing custom logic. The term "dialog flow" may refer to the definition of the skill-user interaction and may describe how a skill responds and behaves according to user inputs. The term "channels" may refer to platform-specific configurations to allow the skills to access messaging platforms or client messaging apps. A single skill may have several channels configured for it so that it can run on different services or platforms simultaneously.

As used herein, an utterance or a message may refer to one or more sentences exchanged during a conversation, where a conversation may refer to a communication session that may include one or more utterances or messages. A conversation may include one or more stages or states. A conversation flow may be an abstraction of multiple conversations that include the same stages or states and the same transitions from stage (or state) to stage (or state). Each conversation may be a specific instance of a corresponding conversation flow. A state or stage of a conversation or conversation flow may be associated with a state of a state machine maintained by a bot system for conducting conversations with other bot systems or persons. In some cases, a state may correspond to an intent or goal of an end user. As used herein, an end user may refer to an end user of a bot system, such as a person or another entity that engages in a conversation with a bot system through a messaging application or platform. For example, an end user may be a customer or a client of an enterprise that owns the bot system. As used herein, a user of an analytic system may refer to an owner, an operator, an administrator, or a developer of a bot system.

In the following description, for the purposes of explanation, specific details are set forth in order to provide a thorough understanding of examples of the disclosure. However, it will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The word "example" or "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots (also referred to as bots, skills, chatterbots, or talkbots) have thus begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

A bot system may include one or more user intent classification engines for identifying end user intents based on end user utterances, and one or more dialog engines for intelligently and contextually responding to user utterances according to the determined end user intents. However, building the bot system, such as the user intent classification engine that can determine the end users' intents based upon user utterances, is a challenging task in part due to the subtleties and ambiguity of natural languages and the dimension of the input space (e.g., possible user utterances) and the size of the output space (number of intents).

A bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, a person of ordinary skill in the art will recognize that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input, the bot may determine the end user's intent in order to determine the appropriate next action to take.

An intent may include a goal that the end user would like to accomplish. An intent maps an end user input to actions that a backend system should perform for the end user. Therefore, based on the phrases uttered by the end user in natural language, the bot would map the end user utterance to a specific use case or job, such as ordering pizza, getting account balance, transferring money, making a purchase, making a return, etc. Human conversations are often non-linear in nature. End users may often branch into different states during a conversation. For example, if an end user wants to transfer funds from account A to a recipient, the end user may start a conversation with the bot system by, for example, asking the bot to pay the recipient for dinner. The bot may respond with, for example, "from which account?". The end user may pick a checking account but may then realize that he or she is not sure about the balance in the account. Thus, the end user may switch context to ask for balance and recent transactions, and so on. In other words, the end user may trigger changes in the flow and states, for example, from transferring money to checking balance, and then to recent transactions. At a certain time point, the end user may decide to return to the original intent—paying the recipient. Thus, one task of the bot system is to dynamically determine end user intents from natural language utterances.

A bot may use a natural language processing (NLP) engine and/or a machine learning model (e.g., an intent classifier) to map end user utterances to specific intents. For example, a machine learning based NLP engine may learn to understand and categorize the natural language conversations from the end users and to extract necessary information from the conversations to be able to take precise actions, such as performing a transaction or looking up data from a backend system of record.

FIG. 1 depicts a distributed system 100 that may be used to implement a bot system for communicating with an end user using a messaging application according to certain embodiments. System 100 may include a bot system 120, one or more messaging application systems 115, and one or more end user devices, such as one or more mobile devices 110. In some examples, the messaging application may be installed on an electronic device (e.g., a desktop computer, a laptop, mobile device 110, or the like). While the discussion herein will reference a mobile device and a messaging application, a person of ordinary skill in the art will recognize that any electronic device may be used and any messaging platform or messaging application may be used, such as FACEBOOK® Messenger, WHATSAPP® instant messaging software, WECHAT® mobile text and voice messaging communication service, KIK® Messenger, TELEGRAM® Messenger, SKYPE MOBILE® messenger, Short Message Service (SMS), or any other messaging application that provides a platform for end users to communicate. In other examples, the messaging application may be run through a browser (e.g., GOOGLE CHROME® browser, MOZILLA® FIREFOX® browser, and INTERNET EXPLORER browser) that is installed on mobile device 110. In some embodiments, two or more messaging applications may be installed on an end user device for communicating through two or more messaging platforms (such as two or more messaging application systems 115).

The messaging application may be facilitated by a messaging platform, such as messaging application system 115. Mobile device 110 may be connected to messaging application system 115 by a first network (e.g., the Internet). Messaging application system 115 may be a messaging platform provided by a third party, such as Facebook, Tencent, Google, Microsoft, etc. Messaging application system 115 may manage content sent and received through the messaging application across multiple mobile devices or other end user devices.

A bot system 120 (e.g., implemented on one or more servers) may also be communicatively connected to messaging application system 115 to send and receive massages. The communication between messaging application system 115 and bot system 120 may be through a second network (e.g., the Internet). The first network and the second network may be the same network, or they may be similar or completely different networks. Messaging application system 115 may route content (e.g., a message or information from a message) from mobile device 110 to bot system 120 using the Internet. In some embodiments, the destination of the content (e.g., an identification of bot system 120) may be included in the content as a nominal addressee. In some embodiments, bot system 120 may also be configured to communicate with two or more messaging application systems 115.

As discussed above, the content being exchanged between end users or between an end user and a bot system may include, for example, text, emojis, audio, media (e.g., a picture, a video, a link), or any other method of conveying a message. An example of a message received by bot system 120 from, for example, FACEBOOK® Messenger may include:

```
{
    "channel": {
        "tenant_id": "DemoTenant",
        "client_data": {
            "channel_user_id": "1103645260000000",
            "type": "facebook",
            "chat_id": "1103645260000000"
        },
```

```
        "type": "facebook",
        "bot_id": "DemoBot",
        "client_id": "facebook"
    },
    "id": "411fc848-350b-47de-89c3-a0ecee314401",
    "text": "May I have a cheese pizza?",
    "type": "text"
}
```

Bot system 120 may receive the content from messaging application system 115 using a connector 130 that acts as an interface between messaging application system 115 and bot system 120. In some embodiments, connector 130 may normalize content from messaging application system 115 such that bot system 120 may analyze content across different messaging application systems. The content normalization processing may include formatting content from each type of messaging application to a common format for processing. In some embodiments, bot system 120 may include one or more connectors for each of the messaging applications (such as FACEBOOK® Messenger, WHATSAPP® instant messaging software, WECHAT® mobile text and voice messaging communication service, KIK® Messenger, TELEGRAM® Messenger, and SKYPE MOBILE® messenger, a Short Message Service (SMS)). In some implementations, connector 130 may route the content to a message-in queue 140. Message-in queue 140 may include a buffer (e.g., a first-in first-out (FIFO) buffer) that stores content in the order received. In some embodiments, each connector 130 may be associated with one or more message-in queues.

Message-in queue 140 may send the content to a message processor 150 when message processor 150 becomes available. In some embodiments, message processor 150 may pull the content from message-in queue 140. Message processor 150 may parse a message and determine an intent of the parsed message as described in detail below. In some embodiments, message processor 150 may include a natural language processor 152 and an intent determination subsystem 154. Natural language processor 152 may parse a message and perform certain semantic analysis, such as identifying a subject, a predicate (e.g., an action), and/or an object. Intent determination subsystem 154 may determine an end user intent based on the parsed message. As described above, the intent may include a purpose of the message. For example, a purpose of a message may be to order a pizza, order a computer, transfer money, ask a question regarding delivery, etc. In some embodiments, parameters associated with the intent that more specifically define or clarify the action to take, which may be referred to as entities, may also be extracted from the message by natural language processor 152 and/or intent determination subsystem 154.

After the end user intent is determined based on the content by message processor 150, the determined intent (and the parameters associated with the intent) may be sent to an action engine 160. Action engine 160 may be used to determine an action to perform based on the intent (and the parameters associated with the intent) and the current state (or context) of a state machine as described above. For example, action engine 160 may send certain outbound content to message-out queue 170 as the response and/or may send a command to or retrieve information from some enterprise services, such as enterprise service 125. Message-out queue 170 may send the outbound content to connector 130. Connector 130 may then send the outbound content to a messaging application system indicated by action engine 160, which may be the same as or different from messaging application system 115. Messaging application system 115 may then forward the outbound content to the messaging application on mobile device 110.

Bot system 120 may communicate with one or more enterprise services (e.g., enterprise service 125), one or more storage systems for storing and/or analyzing messages received by bot system 120, or a content system for providing content to bot system 120. Enterprise service 125 may communicate with one or more of connector 130, action engine 160, or any combination thereof. Enterprise service 125 may communicate with connector 130 in a manner similar to messaging application system 115. Enterprise service 125 may send content to connector 130 to be associated with one or more end users. Enterprise service 125 may also send content to connector 130 to cause bot system 120 to perform an action associated with an end user. Action engine 160 may communicate with enterprise service 125 to obtain information from enterprise service 125 and/or to instruct enterprise service 125 to take an action identified by action engine 160.

In some embodiments, bot system 120 may include one or more timers. A timer may cause action engine 160 to send content to an end user using connector 130 and messaging application system 115 after an amount of time has lapsed. In some embodiments, a timer may send content to bot system 120 similar to an end user or enterprise service 125. For example, the timer may send a message to bot system 120 to be analyzed as a message from an end user would be analyzed.

In one specific embodiment, an end user may send a message to bot system 120 using mobile device 110 through messaging application system 115. The message may include a greeting, such as "Hello" or "Hi." The bot system may determine that a new conversation has begun with the end user and start a state machine. In some embodiments, the bot system may identify one or more characteristics of the end user. For example, the bot system may identify a name of the end user using a profile associated with the end user on the messaging application system. Using the one or more characteristics, the bot system may respond to the end user on the messaging application. The response may include a message to the end user that responds to the message received from the end user. For example, the response may include a greeting with the name of the end user, such as "Hi Tom, What can I do for you?". Depending on the enterprise associated with the bot system, the bot system may progress to accomplish a goal of the enterprise. For example, if the bot system is associated with a pizza delivery enterprise, the bot system may send a message to the end user asking if the end user would like to order pizza. The conversation between the bot system and the end user may continue from there, going back and forth, until the bot system has completed the conversation or the end user stops responding to the bot system.

In some embodiments, the bot system may initiate a conversation with an end user. The bot system-initiated conversation may be in response to a previous conversation with the end user. For example, the end user may order a pizza in the previous conversation. The bot system may then initiate a conversation when the pizza is ready. In some embodiments, the bot system may determine the pizza is ready when an indication is received from the enterprise associated with the bot system (e.g., an employee sending a message to the bot system that the pizza is ready). The conversation may include a message sent to the end user indicating that the pizza is ready.

In some embodiments, the bot system may send a message to the end user on a different messaging application than the messaging application that a previous message was received. For example, the bot system may determine to send the message using Short Message Service (SMS) rather than FACEBOOK® Messenger. In such implementations, the bot system may integrate multiple messaging applications.

In some embodiments, the bot system may determine to start a conversation based on a timer. For example, the bot system may determine to have a one-week-timer for an end user after a pizza is ordered. Expiration of the one-week timer may cause the bot system to start a new conversation with the end user for ordering another pizza. The timer may be configured by the enterprise and implemented by the bot system.

As described above, in some embodiments, action engine 160 may send command to or retrieve information from some enterprise services 125. For example, when bot system 120 (more specifically, message processor 150) determines an intent to check balance, bot system 120 may determine which of several accounts (e.g., checking or savings account) to check the balance for. If the end user inputs "What's my balance in my savings account," bot system 120 may extract "savings" and send a command to a bank server to check the balance, and then send the received balance information to the end user through a message. If the end user initially only uttered "what's the balance in my account?", bot system 120 may send a message to the end user prompting the end user to further specify the specific account, or may retrieve information for all accounts of the end user and send the account information to the end user for the end user to make a selection.

In some embodiments, the bot system may maintain information between conversations. The information may be used later so that the bot system does not need to ask some questions every time a new conversation is started between the end user and the bot system. For example, the bot system may store information regarding a previous order of pizza by the end user. In a new conversation, the bot system may send a message to the end user that asks if the end user wants the same order as last time.

In some embodiments, bot system 120 may store information associated with end users in a cache. The cache may write to a database to save the information after an outbound message is sent to the messaging application system from connector 130. In other embodiments, the cache may write to the data at different times (e.g., after a particular event, after each event, after an amount of time, or any other metric to determine when to write to the database).

Bot system 120 may allow each component to be scaled when slowdowns are identified. For example, if bot system 120 identifies that the number of messages that are arriving at connector 130 exceeds a threshold, an additional one or more connectors may be added to connector 130. In addition, the number of message-in queues, message processors, instances of action engines, and message-out queues may be increased depending on where the slowdown occurs. In such implementations, additional components may be added without having to add other additional components. For example, a connector may be added without having to add an additional instance of the action engine. In some implementations, one or more components, or a portion of a component, of bot system 120 may be run on a virtual machine. By running on a virtual machine, additional virtual machines may be initiated at desired.

As described above, building the bot system, such as the user intent classification engine that can determine the end user's intents based upon end user utterances, is a challenging task in part due to the subtleties and ambiguity of natural languages and the dimension of the input space (e.g., possible end user utterances) and the size of the output space (number of intents). As such, a new bot system may need to be monitored, debugged, and modified in order to improve the performance of the bot system and user experience with the bot system. In many cases, it may be difficult to more specifically identify the root causes of the lower than desired performance of the bot system and determine how to improve the bot system without using an analytics or optimization tool.

In some circumstances, a bot owner, developer, or administrator may want to monitor the operational status of a bot, and understand how the bot is being used and where end users abandoned the bot, in order to improve the bot. For example, the bot owner, developer, or administrator may want to know which bot conversations are successful and which ones are not, in order to identify and diagnose underperforming elements of the bot system.

According to some embodiments, an analytic system may be integrated with a bot system. The analytic system may monitor events occurred during conversations between end users and the bot system, aggregate and analyze the collected events, and provide information regarding the conversations graphically on a graphic user interface at different generalization levels, such as all conversations, different categories of conversation, and individual conversations. For example, the graphic user interface may display options to filter or select certain types of conversations or individual conversations, and display the selected information graphically, for example, by visualizing the paths of the conversations. The analytic system may also provide suggestions, options, or other information for improving the bot system.

Figure 2:
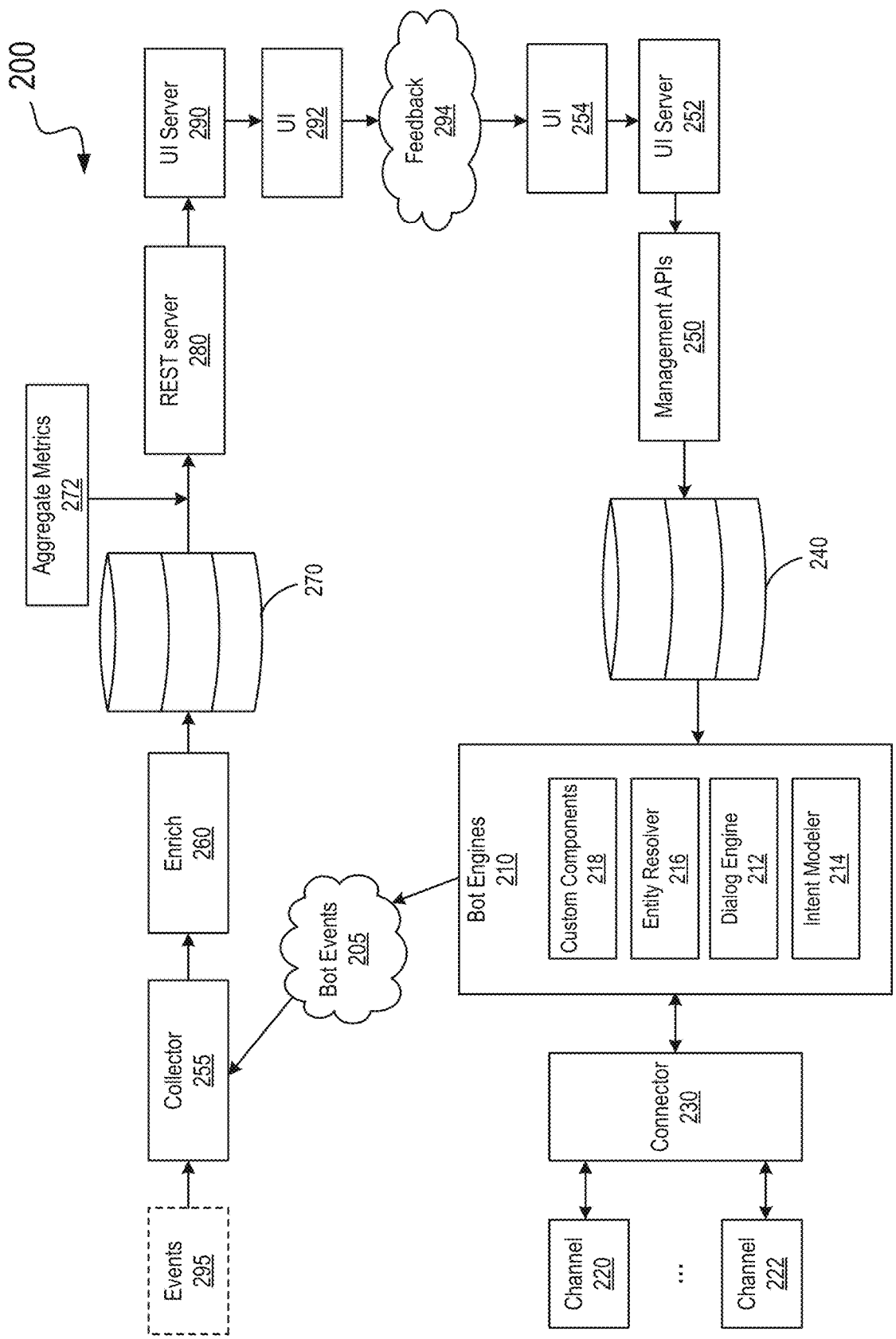
FIG. 2 depicts an integrated system including a bot system and a bot analytic system for monitoring, analyzing, visualizing, and improving the performance of a bot system according to certain embodiments.

FIG. 2 depicts an integrated system 200 including a bot system (such as bot system 120) and a bot analytic system for monitoring, analyzing, visualizing, and improving the performance of the bot system according to certain embodiments. As illustrated, the bot system may include a connector 230 and a plurality of bot engines, such as a dialog engine 212, an intent modeler 214, an entity resolver 216, and custom components 218. The bot system may also include a database 240, management APIs 250, a user interface 254, and a UI server 252. The bot analytic system may include a collector 255, an enrichment engine 260, a database 270, and a REST server 280. The bot analytic system may also include a user interface 292 and a UI server 290. Collector 255 of the bot analytic system may collect events 205 occurred at the bot system. Feedback 294 from the bot analytic system may be provided to the bot system through user interface 292 and user interface 254.

Connector 230 may act as an interface between the bot system and one or more end users through one or more channels, such as channels 220 and 222. Each channel may be a messaging application, such as a messaging channel (such as Facebook Messenger, Facebook WhatsApp, WeChat, Line, Kik, Telegram, Talk, Skype, Slack, or SMS), a virtual private assistant (such as Amazon Dot, Echo, or Show, Google Home, Apple HomePod, etc.), a mobile and web app extension that extends native or hybrid/responsive mobile app or web application with chat capabilities, or voice based input (such as devices or apps with interfaces that use Siri, Cortana, Google Voice, or other speech input for interaction). In some embodiments, connector 130 may normalize content from different channels such that the bot system may analyze content across different messaging application systems. The content normalization processing may include formatting content from each type of messaging application to a common format for processing. In some embodiments, the bot system may include one or more connectors for each of the channels.

Intent modeler 214 may be used to determine end user intents associated with end user utterances. In some embodiments, intent modeler 214 for determining an intent of an end user based on one or more messages received by the bot system from the end user may use a natural language processor to tag the parts of speech (verb, noun, adjective), find lemmas/stems (runs/running/ran→run), and tag entities (Texas→LOCATION). In some embodiments, intent modeler 214 may normalize the message. For example, "Mary ran to Texas" may become "PERSON run to LOCATION." Intent modeler may also include logic to detect words which have the same meaning within an end user message. For example, if the training dataset includes: "Mary ran to Texas" and "Bob walked to Detroit," both mapped to the same intent, and run/walk appear in the same set of intents, intent modeler 214 may learn that for the purposes of intent resolution run=walk. In one illustrative example, "Mary ran to Texas" may become "PERSON run to LOCATION" and "Bob walked to Detroit" may become "PERSON walk to LOCATION." In the illustrate example, both sentences may be associated with a same intent because "noun run to noun" is the same as "noun walk to noun" for the purpose of intent resolution. In another example, "I want to order a large cheese pizza" and "I want to order a small pepperoni pizza" may both be normalized into "I want to order a Bots_PizzaSize Bots_Toppings pizza."

After normalization, a probability that the occurrence of a word may signify a certain intent may be determined. In some examples, probabilities can be combined using basic probability arithmetic as if they were independent. For example, if "order" suggests a 20% probability of ordering pizza, and "pizza" suggests a 10% probability of ordering pizza, the total probability would be 1−(1−0.2)(1−0.1) =28%. Some probabilities may be based on presence of words, or based on certain language elements, like presence of negations or personal pronouns.

Another level of rule may be a template rule, which is a combination of words. In some examples, every sentence in a training dataset, once normalized, may automatically become a rule. In such examples, a training dataset may include a very small number of short sentences. The template rule may return a probability of 1. New rules may be generated from rules via a process of induction. For example, the following sentences may belong to track spending: "How much did I spend last month on gas?" and "How much did I spend in May on food?." The sentences may be used to induce the rule "How much did I spend" as that is the part which is shared between them. In other examples, the training dataset may include the phrase "How much did I spend" to achieve the same result.

Examples described above allow definitions of an intent to not include duplicates, such as variations on named entities (e.g., "Send money to Sue" and "Send money to Bob"). However, similar sentences where one or two words are different may be used for the training. Similar sentences may allow the model to learn which words may have the same meaning for intent resolution and which words may be common misspellings.

If a particular word or set of words (like the verb) is important to an intent, the probabilities may be manipulated by having more examples using such a word (and its synonyms) and fewer examples with such a word for other intents.

Examples may also be provided to prevent the model from making wrong assertions. For example, particular sub-phrases, or words only appearing for a certain intent, may cause wrong assertions. Similarly, the model may be prevented from synthesizing broad rules using similar sentences belonging to different intents for the training.

Entity resolver 216 may identify entities (e.g., objects) associated with the end user intents. For example, in addition to the end user intent identified by intent modeler 214, such as "order pizza," entity resolver 216 may resolve entities associated with the intent, such as the pizza type, toppings, and the like.

Dialog engine 212 may be used to handle the conversations between the end users and the bot system. For example, dialog engine 212 may respond to end user utterances based on the end user intent identified by intent modeler 214 and entities associated with the end user intent identified by entity resolver 216. In some embodiments, dialog engine 212 may use a state machine that includes user defined states (e.g., end user intents) and actions to take in the states or from state to state to handle the conversations with end users.

Custom components 218 may include customized modules for the specific bot system. For example, a financial bot may include custom components that may be used to, for example, checking balance, transfer funds, or pay bills.

Database 240 may be used to store data for the bot system, such as data for the classification models, logs of conversation, and the like. Management APIs 250 may be used by an administrator or developer of the bot system to manage the bot system, such as re-training the classification models, editing intents, or otherwise modifying the bot system. The administrator or developer may use user interface 254 and UI server 252 to manage the bot system.

Various events may be generated while the bot system is running. The events may be generated based upon one or more instructions included in the bot system. For example, an event may be generated when the bot system has entered into a particular state, where the particular state is defined by an administrator or developer of the bot system. As events are generated, the events may be collected, stored, and analyzed by the bot analytic system. When capturing an event, additional information associated with the event may also be collected, where the additional information may indicate a present context in which the event is generated.

For example, conversation events may be generated by dialog engine 212. A conversation event may include a message received by a bot system from an end user device (referred to as msg_received). Msg_received may include one or more of the following parameters or variables: the content of the message, the time when the message is received by the bot system, the language of the message received, a device property (e.g., version or name), an operating system property (e.g., version or name), a geolocation property (e.g., an Internet Protocol address, a latitude, a longitude, or the like), identification information (e.g., a user ID, a session ID, a bot system ID, a tenant ID, or the like), a time stamp (e.g., device created, device sent, collector derived time stamp), the channel, or the like.

A conversation event may also include a message sent by a bot system to an end user device (referred to as msg_sent). Msg_sent may include one or more of the following: the content of the message (e.g., text or HTML of the message), the time when the message is sent by the bot system, the language of the message, a creator of the message (e.g., the bot system or an end user device), a device property, an operating system property, a browser property (e.g., version or name), an app property (e.g., version or name), a geolocation property (e.g., an Internet Protocol address, a latitude, a longitude, or the like), identification information (e.g., a user ID, a session ID, a bot system ID, a tenant ID, or the like), a channel (e.g., Facebook or Webhook), or the like.

Dialog engine 212 may also generate dialog state execution events. As described above, dialog engine 212 may use a state machine to determine the flow of the conversations with end users. The state machine may include a set of states and rules of transition between the states. Dialog engine 212 may execute the state machine for each end user conversation, and a dialog state execution event may be produced for each state that dialog engine 212 steps through to process end user utterances. Attributes of a dialog state execution event may include, for example, a state name, component name, next action, entity match, intent match, variable, user query statement, response statement, time of execution, communication language, device property, operating system property, geolocation property, identification information, a time stamp, a channel, or the like. The state name be a name of a state currently executed or an "error state." The component name may be a name of a bot component executed for a current state. The next action may be a next action to be executed. The entity match may be an entity resolved in a current message. The intent match may be an intent resolved with a score value. The variable may be a variable value for a current state. The query statement may be a message sent by an end user. A response statement may be a message sent to an end user. The time of execution may be a time stamp of a completed state execution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

An intent resolution event may occur as a result of the execution of intent modeler 214. Intent modeler 214 may use trained or otherwise defined classification models to identify the end user intents from a set of intents based on the end user utterances. The result of the intent classification may be captured as intent resolution event attributes, which may include, for example, the final intent classification result (e.g., the identified intent) and confidence score associated with each respective intent in the set of intents.

Entity resolver 216 may generate entity resolver events. Entities are objects associated with end user intents. Entity definition rules may be determined when the bot system is created. For example, in addition to resolving end user intents, such as "order pizza," the bot system may also use entity resolver 216 to resolve associated entities, such as pizza type, toppings, and the like. An entity resolver event may be captured at an entity resolution. Examples of attributes associated with an entity resolver event may include an entity name, a rule applied, a search term, a state resolved, a query statement, an entity type, a time of execution, a communication language, a device property, an operating system property, a browser property, an app property, a geolocation property, identification information, a time stamp, a channel, or the like. The entity name may be a name of an entity currently being resolved. The rule applied may be, for example, preceding, following, or aggregate. The search term may be from, to, destination, origin, or the like. The state resolved may be a dialog state resolved for the entity. The query statement may be a message containing entity value. The entity type may be system or derived. The time of execution may be a time stamp of an entity resolution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

A custom component may also generate events, such as a predefined event or a custom event. The predefined event may be a property captured at an execution of a custom component. Examples of attributes pf the predefined event may include: a component name, an event name, a payload, a time of execution, a communication language, a device property, an operating system property, a browser property, an app property, a geolocation property, identification information, a time stamp, a channel, or the like. The component name may be a name of a custom component currently being executed. The event name may be invoked, invocation_failed, replied, replied_failed, or the like. The payload may be, in case of failure, reason for failure, stack trace, or the like. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

The custom component may also issue a custom event during execution of a custom component. Examples of attributes of the custom event may include a component name, an event name, a custom payload, a time of execution, a communication language, a device property, an operating system property, a browser property, an app property, a geolocation property, identification information, a time stamp, a channel, or the like. The component name may be a name of a custom component currently being executed. The event name may be a user-defined event name (e.g., Balance_Retrieved). The payload may be, for example, {"amount": "USD 100", "account": "checking"}. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

Error events and timeout events may also be generated by the bot system during execution. An error event may be generated when an error occurs. A timeout event may be generated when the end user conversation has been inactive for a period of time, which may be configured at the channel.

The bot analytic system may collect the events and additional information as the bot system conducts conversations with end users and generates the corresponding events. For example, collector 255 may collect the events and the additional information and send the collected information to a queue. In some embodiments, collector 255 may be configurable and can be programmed to collected different events and/or event attributes described above as desired. For example, collector 255 may be configured to capture dialog state attributes, intent resolution attributes, entity resolution attributes, and error and timeout attributes. In some embodiments, collector 255 may also be configured to collect information regarding events 295 generated by a system other than the bot system.

Enrichment engine 260 may perform validation and enrichment on the collected events and other information and write them to database 270. For example, based on a collected IP address, enrichment engine 260 may determine the location of the end user associated with the IP address. As another example, enrichment engine 260 may extract certain features from the collected information, such as determining a web browser or channel used by the end user. REST server 280 may analyze the enriched events and other information and generate various reports based on certain aggregate metrics 272. The reports may be displayed to an owner, administrator, or developer of the bot system on user interface 292 through UI server 290. The owner, administrator, or developer of the bot system may provide feedback 294 to the bot system for improving the bot system.

As described above, building a bot system, such as the user intent classification engine (e.g., message processor 150 or intent modeler 214) that can determine the end users' intents based upon user utterances, is a challenging task in part due to the subtleties and ambiguity of natural languages, the dimension of the input space (e.g., possible user utterances), and the size of the output space (number of intents). In some bot systems, training utterances and the associated intents may be used to train the bots to identify the intents based on user utterances. For example, in a bot system for a shoe store that may be interested in capturing the intent of a user to "purchase shoes," the high-level intent of "purchase shoes" may be fed into the user intent classification engine, and training phrases, such as "I want to buy some shoes", "I am looking for a pair of shoes", "I want shoes," and the like, may also be provided to train the user intent classification engine. In some embodiments, the user intent classification engine may attempt to expand on the example phrases and use the example phrases to match user utterance. For example, the user intent classification engine may be able to match the phrase "I want to purchases boots" to the intent "purchase shoes" because the natural language processor (e.g., natural language processor 152) may understand that the semantic distance between boots, shoes, or even slippers is small and they all refer to a same category of things. Such user intent classification engines may work for some chatbot interactions, but may not be able to handle more complicated tasks.

Instead of using intent matching as described above, some bot systems may combine lower level analysis results (syntax analysis, entities, key phrases) with a knowledge graph for a specific domain to identify user intents. The knowledge graph (or ontology) may connect intents, phrases, nouns, and adjectives to concepts in the domain. For example, the bot may use the natural language processor to analyze the inputs from the users, and use the analysis results to navigate through the knowledge graph and find the user intents at a semantic level. The user intents can then be used to determine the most appropriate next response to the user.

A knowledge graph acquires and integrates information into an ontology, which includes a set of concepts and categories in a subject area or domain and shows their properties and the relations between them. In some cases, a knowledge graph may also apply a reasoner to derive new knowledge. A knowledge graph may capture facts about places, people, things, processes, applications, and relationships among them, and use such information to provide, for example, more relevant information to users that perform searches or queries. A knowledge graph generally represents a knowledge base using a directed graph with labeled edges (representing relations) between nodes or vertices (representing entities). For example, a knowledge graph may be based on a set of triples in the form of (subject, predicate, object), such as (Obama, born in, Hawaii), (Brazilian football team, has position, goalkeeper), etc.

Figure 3:
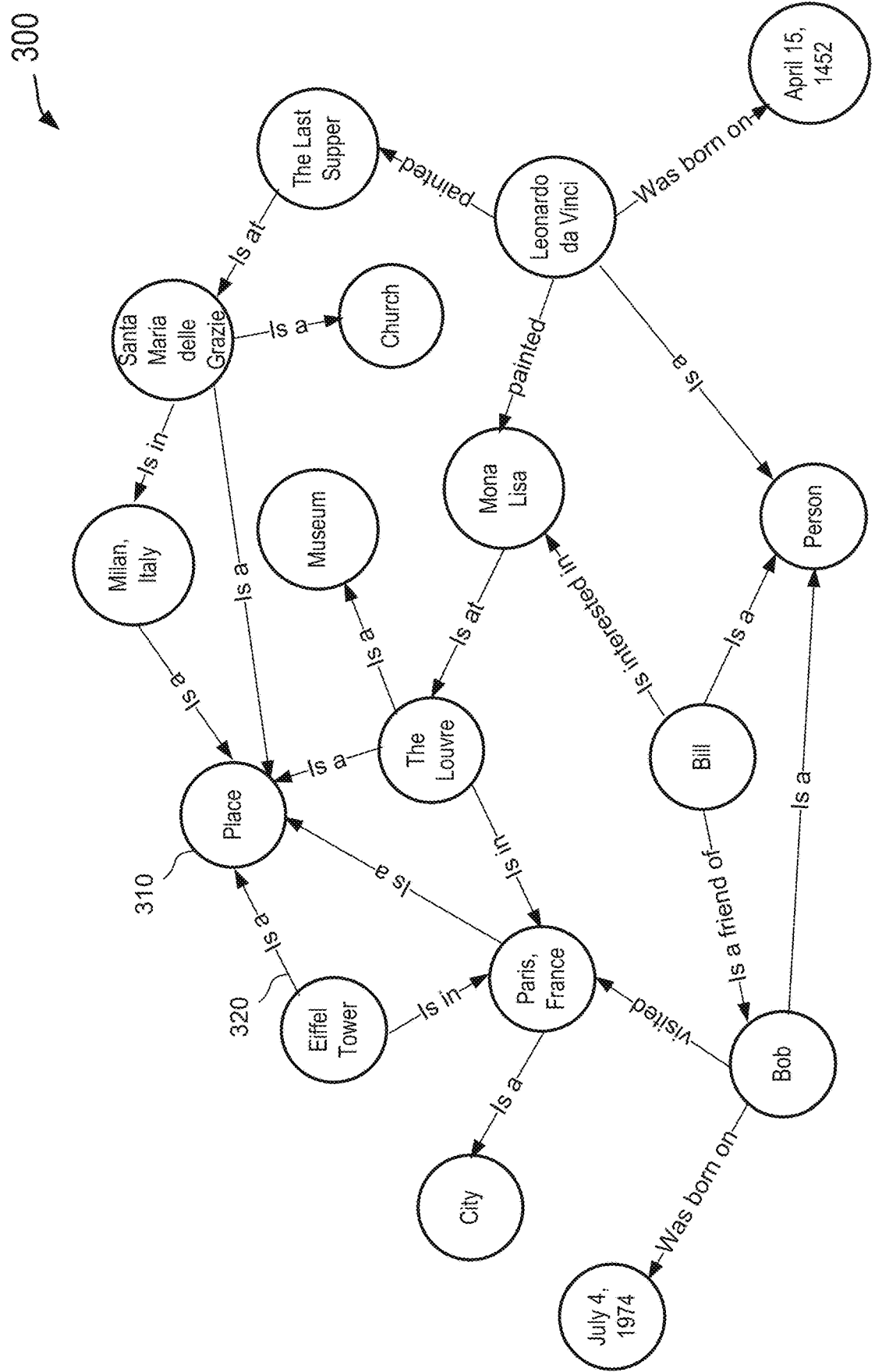
FIG. 3 illustrates an example of a knowledge graph.

FIG. 3 illustrates an example of a knowledge graph 300. Knowledge graph 300 may include a plurality of vertices 310 representing, for example, places (such as Paris), people (such as Bob, Bill, and Leonardo da Vinci), things (such as Eiffel Tower and Mona Lisa), concepts (e.g., time, ages, dimensions, and categories of things, such as city, person, and place), processes, applications, and the like. Vertices 310 are connected by labeled edges 320 that describe the relationship between two vertices in each pair of connected vertices. Edges 320 can be unidirectional or bidirectional. One vertex 310 may be retrieved from another vertex 310 by traversing knowledge graph 300 through paths formed by edges 320.

FIGS. 4A-4D illustrate an example of a process of building a knowledge graph based on a knowledge base, such as a book or Wikipedia. In FIG. 4A, a string 410 (e.g., "Leonardo da Vinci") may be obtained from the knowledge base. In FIG. 4B, an entity 420 (e.g., "Leonardo da Vinci") may be identified and recognized from string 410. In FIG. 4C, entities 432 that are related to entity 420 may be identified from the knowledge base, and may be added to a graph 430. In FIG. 4D, relations between entities 432 may be determined from the knowledge base and added to the graph as edges 442 or connections between entities 432 to form a knowledge graph 440 that includes a plurality of entities 432 and edges 442. Entities 432 and edges 442 may be represented by triplets in the form of (subject, predicate, object), (entity, attribute, value), or other forms. The labels on edges 442 may indicate the relations between entities 432.

Knowledge graph 440 can be used as a seed graph to build a larger scale knowledge graph. For example, related entities of entities 432 in knowledge graph 440, and the relationship between the related entities and entities 432 in knowledge graph 440 can be identified or determined from the knowledge base or a reference knowledge base (e.g., an external knowledge base), and added to knowledge graph 440 to further expand knowledge graph 440. The expansion of knowledge graph 440 may continue until, for example, the knowledge in a given domain is exhausted, which may result in a knowledge graph for the given domain.

Applications of knowledge graphs in natural language understanding includes QnA, such as answering questions by embedding relevant sections of a knowledge graph, or generating a relevant query sub-graph using a reward function learned by a deep convolutional neural network. A knowledge graph can also be used, for example, by a search engine to provide more related information in response to a user search, or by a chatbot to perform intent classification as described above.

A chatbot may perform better in a specific domain with sufficient data. For a given bot, the user provided dataset may only include, for example, about 50-100 utterances. This limited dataset may not be sufficient to build a knowledge graph that can be used by the bot to function properly. Reference knowledge graphs or knowledge bases, such as WikiData, Freebase, DBpedia, etc., may be used to expand the knowledge in the specific knowledge domain and generate the customized knowledge graph.

In some embodiments, a knowledge graph may be expanded by, for example, randomly walking through reference knowledge graphs or other knowledge bases, and selecting the information from the reference knowledge graphs or knowledge bases based on, for example, the frequencies the nodes of the reference knowledge graphs or knowledge bases have been visited. However, the quality of the knowledge graph generated by random walking may not be sufficient for applications such as chatbots. For example, a knowledge graph generated by the random walking may be noisy.

According to certain embodiments, a method of building a customized knowledge graph for a given domain (e.g., a specific bot) using a customer dataset (including, e.g., user utterances, intents, entities, and questions and answers (QnAs)) and reference (e.g., external) knowledge bases (such as WikiData) is disclosed. The customized knowledge graph may be domain specific and may be generated in two main phases. First, entities may be extracted from the customer dataset, such as user provided utterances, and used as vertices or nodes of an initial knowledge graph that may be used as a seed graph for expansion. These extracted entities and the links among them can be used to form the seed graph to initialize the customized knowledge graph. In the second phase, the seed graph may be expanded by traversing a reference knowledge graph using a finite state machine, where entities in the seed graph may be mapped to the reference knowledge graph as the starting vertices for traversing the reference knowledge graph and selecting candidate entities to add to the customized knowledge graph. The candidate entities selected from the reference knowledge graph can then be filtered based on their priority scores to add to the customized knowledge graph.

Figure 5:
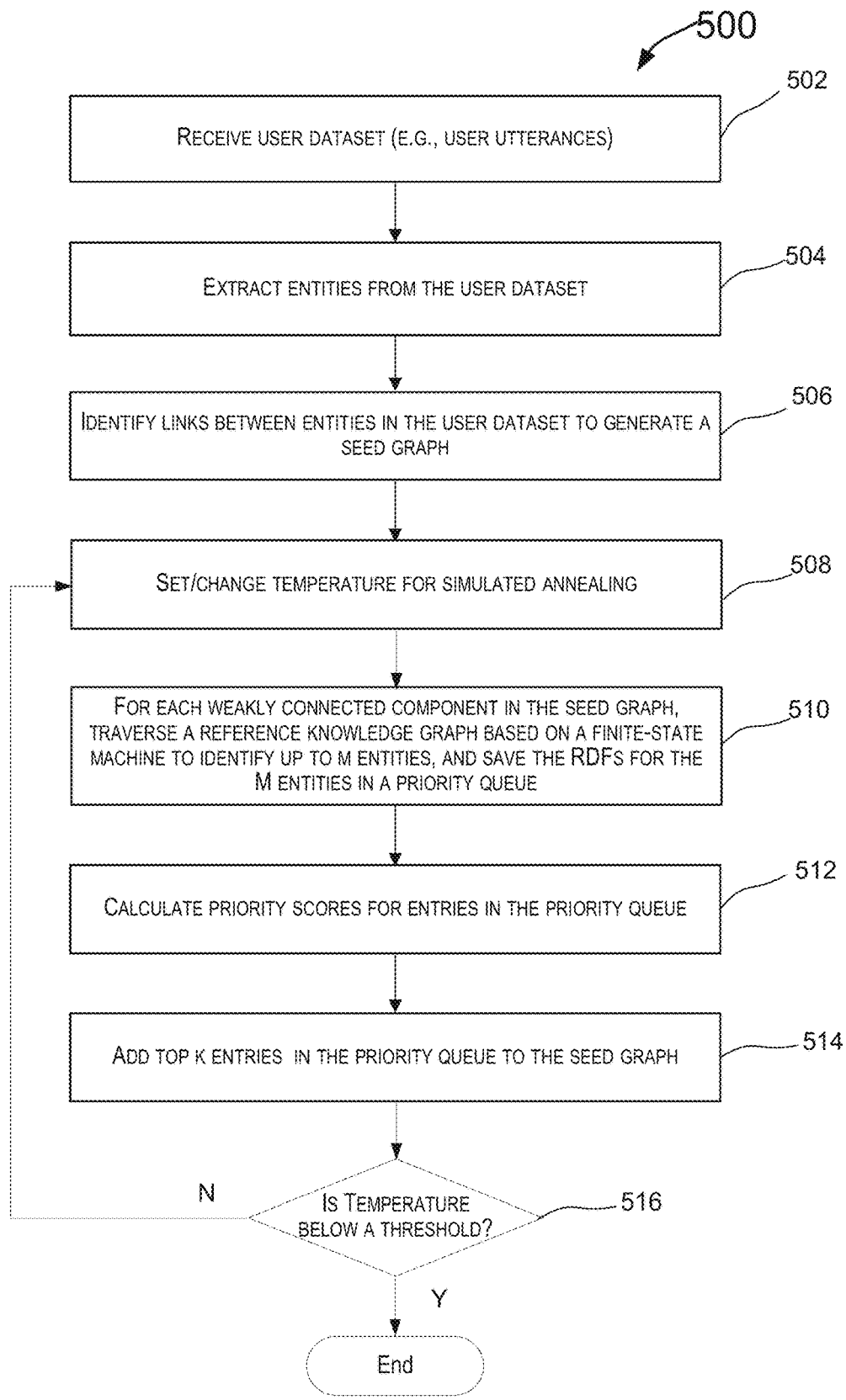
FIG. 5 is a simplified flow chart illustrating an example of a method for building a customized knowledge graph for a specific domain (e.g., for a chatbot) according to certain embodiments.

FIG. 5 is a simplified flow chart 500 illustrating an example of a method for building a customized knowledge graph (e.g., for a chatbot) according to certain embodiments. The processing presented in FIG. 5 and described below is intended to be illustrative and non-limiting. Although FIG. 5 depicts the various operations occurring in a particular sequence or order, this is not intended to be limiting. In certain alternative embodiments, the operations may be performed in some different order or some operations may also be performed in parallel. Furthermore, embodiments of the method may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. One or more processors may perform the associated tasks.

At 502, a computing system may receive a user dataset. The user dataset may include, for example, user utterances, user defined entities and intents, user provided questions and answers, and the like. As described above, in some embodiments, the user dataset may include, for example, about 50 to about 100 utterances, where each utterance may or may not be tagged with the associated intents.

At 504, entities may be extracted from the user dataset, such as the user utterances, using techniques, such as part-of-speech (PoS) tagging (see, e.g., Kristina Toutanova et al., "Feature-Rich Part-of-Speech Tagging with a Cyclic Dependency Network," Proceedings of HLT-NAACL 2003, pp. 252-259), named-entity recognition (NER) (see, e.g., Jenny Rose Finkel et al., "Incorporating Non-local Information into Information Extraction Systems by Gibbs Sampling," Proceedings of the 43rd Annual Meeting of the Association for Computational Linguistics (ACL 2005), pp. 563-370), constituency parsing using, for example, CoreNLP (see, e.g., Manning et al., "The Stanford CoreNLP Natural Language Processing Toolkit," Proceedings of the 52nd Annual Meeting of the Association for Computational Linguistics: System Demonstrations, 2014, pp. 55-60), and the like. In some embodiments, the entities may be detected from the user dataset using entity linking techniques, such as the Dexter 2 technique (see, e.g., Ceccarelli et al., "Dexter: an open source framework for entity linking," Proceedings of the sixth international workshop on Exploiting semantic annotations in information retrieval, ACM 2013, pp. 17-20).

At 506, relations between the identified entities may be identified based on the user dataset, for example, using the techniques for extracting entities described above. The relations may be used to link or connect the identified entities to generate a seed graph that includes the identified entities (as nodes or vertices in the seed graph) and the relations between the identified entities (as edges between vertices). The edges may be directed edges including the direction of the edges between entities. The edges can be unidirectional or bidirectional. The seed graph may include a small number of vertices and may be a sparse graph that may not include all relations between the entities. The seed graph may include one or more weakly connected components (WCCs), where a WCC refers generally to a maximal subgraph of a directed graph such that it is possible to reach any node starting from any other node by traversing the edges through an undirected path (i.e., ignoring the directions of the edges). The nodes in a weakly connected component may all have either an out-degree or an in-degree of at least 1. In contrast, a strongly connected component may refer to a subgraph in which there is a directed path from every node to every other node in the subgraph.

At 508-516, a simulated annealing optimization method (see, e.g., Nourani & Andresen, "A comparison of simulated annealing cooling strategies," J. Phys. A: Math. Gen. 51. 1998, 8373-8385) may be used to iteratively expand the seed graph by gradually adding entities and relations to the seed graph. In each iteration, a temperature value may be set or adjusted at 508. The temperature may be used for determining priority scores of candidate entities to add to the knowledge graph as described in detail below.

At 510, for each weakly connected component in the seed graph, each entity (i.e., vertex) in the weakly connected component may be mapped to a reference knowledge graph and used as the starting vertex for traversing the reference knowledge graph and identifying up to M candidate entities using a finite state machine as described in more detail below. The resource description frameworks (RDFs) of the identified candidate entities may be saved as entries in a priority queue.

At 512, entries in the priority queue may be scored using a scoring function that is a function of temperature. In some embodiments, the total number of candidate entities identified and added to the priority queue at 510 may be more than a certain threshold number N. Techniques such as a reservoir sampling technique (see, e.g., J. Vitter, "Random sampling with a reservoir," ACM Trans. on Mathematical Software 11(1):37-57, March 1985) may be performed to reduce the number of entries in the priority queue to N, in order to reduce the time for calculating the priority scores for the entries, which can be more computationally expensive than knowledge graph traversal. A priority score may be calculated for each of the N candidate entities in the N entries and the corresponding path to reach the candidate entity, as described in more detail below.

At 514, K entries from the up to N entries in the priority queue with the highest scores may be selected, and the corresponding entities and relations identified by the K entries may be added to the seed graph to expand the seed graph.

At 516, if it is determined that the temperature is above a threshold, the operations at 508-514 may be performed again in the next iteration during which the temperature (and thus the scoring function) may be changed and the entities in the weakly connected components may be different because the seed graph has been modified using the top K entries in the priority queue. When the temperature is below the threshold, the optimization of the customized knowledge graph may end, and the customized knowledge graph may be used for the user application associated with the user dataset, such as a specific bot or search engine.

Table 1 shows an example of pseudo code for implementing a method of generating a customized knowledge graph, such as the method described above with respect to FIG. 5. The pseudo code in Table 1 shows an example of a finite state machine used to traverse a reference knowledge graph. In Table 1, the first line of the pseudo code relates to identifying entities and links between the entities based on the user dataset (e.g., user utterances). Line 2 of the pseudo code relates to creating a seed graph. Line 3 is used to set the initial condition for the simulated annealing process for expanding the seed graph to generate the customized knowledge graph, including initializing the temperature and the priority queue. Lines 4-23 relate to operations performed at each temperature of the simulated annealing process, where lines 5-15 describe traversing a reference knowledge graph using a finite state machine to identify candidate entities and save the RDF triples of the candidate entities as entries in the priority queue, which is described in more detail below. Lines 16-17 relate to reducing the number of entries in the priority queue for priority score calculation when the number of entries in the priority queue are more than a threshold number N. Lines 18-22 relate to calculating priority scores for entries in the priority queue and using the top K entries with the highest priority scores to expand the seed graph. The temperature is updated at line 23.

TABLE 1

Knowledge Graph Generation

```
 1: V ← entity set, E ← all true links between any two v ∈ V
 2: G ← (V, E)
 3: T ← T₀ , pq ← empty Priority Queue
 4: while T > T_min do
 5:    for w_g ∈ Weakly Connected Component(G) do
 6:       fsm ← Finite State Machine according to Fig. 4, cache ← φ
 7:       while State(fsm) ≠ end do
 8:          for w ∈ w_g do
 9:             if w ∈ Disambiguation vertex then
10:                Move fsm to disambiguation state
11:             else if w ∈ Forbidden vertex then
12:                Move fsm to forbidden state
13:             else
14:                Move fsm to entity state
15:             cache ← cache + w
16:       if length(cache) > N then
17:          cache ← Reservoir Sample(cache)
18:       for v ∈ cache do
19:          priority Triples ← Calculate Priority(v)
20:          pq ← pq + priority Triples
21:       G' = top K RDF triples in pq
22:       G ← G ∪ G'
23:       T ← Update Temperature(T)
```

The methods above-described with respect to FIG. 3 and Table 1 may generally include: (1) extracting entities from user provided utterances and building a seed graph based on the extracted entities and links between entities, and (2) expanding the seed graph by repeatedly traversing a reference knowledge graph using a finite state machine, each of which is described in more detail below.

From a user dataset, such as a set of raw sentences (e.g., utterances), entities can be extracted and used as knowledge graph vertices, and existing relations between the entities can be determined and used as the edges between the vertices in the knowledge graph. For example, part-of-speech tagging, named-entity recognition, and constituency parsing using CoreNLP techniques described above with respect to 504 of FIG. 5 may be performed on the utterances to generate a candidate entity list. The PoS tagging technique includes labelling words with their appropriate parts of speech, such as noun, verb, adjective, adverb, pronoun, and the like. Named-entity recognition (also known as entity identification, entity chunking, or entity extraction) includes locating and classifying named entities in unstructured text into pre-defined categories, such as names, organizations, locations, medical codes, time expressions, quantities, monetary values, percentages, and the like. Constituency parsing includes extracting a constituency-based parse tree from a sentence to represent the syntactic structure of the sentence according to a phrase structure grammar. For example, a constituency-based parse tree for a sentence "John hit the ball" may start from the sentence (S) and end in each of the leaf nodes (John, hit, the, ball), where "John" may be a noun (N) node, "hit" may be a verb (V) node (a transitive verb in this example), "the ball" may be a noun phrase (NP) that is a branch node, "the" may be a determiner (D or DT) node, and "ball" may be a noun (N) node.

In some embodiments, the following preprocessing rules may be applied when generating the candidate entity list: (a) checking for NER to not be null and for a word to be part of a noun phrase (e.g., "apple tree" or "the ball") and tagged by NER; (b) checking for matches (extracted entities) where a proper noun (NNP, which names specific people, places, things, or ideas, e.g., "John") is dominated by NP (i.e., NP is the parent of NNP in the semantic parse tree); (c) checking for matches (extracted entities) where a common noun (NN, which is a generic noun naming people, places, things or ideas that are not specific, e.g., "desk") is dominated by NP (i.e., NP is the parent of NN in the semantic parse tree); (d) striping personal pronoun (PRP, e.g., "I," "he," or "she") and determiners (DT) from the above; (e) dividing NER phrases into chunks; and (f) removing numbers and dates from the NER phrases. For example, applying the above rules to a sentence "How much did I spend from my checking account on ServiceA?" may yield a list of candidate entities including ['checking account', 'ServiceA']. In another example, applying the above rules to a sentence "I want to go to an outdoor cafe on Pioneer Day" may yield a list of candidate entities including ['Pioneer Day', 'outdoor cafe', 'outdoor cafe on Pioneer Day'].

In some embodiments, the Dexter 2 technique discussed above may also be used to generate a list of candidate entities by detecting pieces of text that refer to entities in parallel. The two lists of candidate entities may then be combined to generate a list of candidate entities. The combined list of candidate entities may then be used to generate a seed graph for knowledge graph generation.

In some embodiments, the Dexter 2 technique may also be used to link the candidate entities to their corresponding entries in a reference knowledge graph, such as WikiData, where the Dexter 2 technique may be used to link the candidate entities to, for example, Wikipedia entries, and the Wikipedia entries may then be mapped to WikiData entries. For example, entities (and their corresponding WikiData IDs) extracted from an example sentence "How much did I spend from my checking account on ServiceA?" may include "ServiceA" (Q780442) and "checking account" (Q695430). In another example, entities (and their WikiData IDs) extracted from an example sentence "Michael Jordan played basketball at an outdoor cafe on Pioneer Day" may include "café" (Q30022), "Pioneer Day" (Q254295), "basketball" (Q5372), "Michael Jordan" (Q41421), and "outdoor" (Q3312129). In some embodiments, the Mediawiki Webservice API may be used to search for entities that are not matched by the above-described method.

Table 2 illustrates an example of a method for extracting entities from the user dataset (e.g., utterances) and building a seed graph, such as the method described above. In operation 1 shown in Table 2, entities are extracted from the raw sentences of the user utterances using, for example, part-of-speech tagging, named-entity recognition, or constituency parsing using CoreNLP techniques as described above.

TABLE 2

Method for extracting entities and building a seed graph

1. Extract entities from raw sentences:
   a. Part-of-speech tagging (PoS)
   b. Named entity recognition (NER)
   c. Constituency parse using CoreNLP
2. Apply preprocessing Rules:
   a. Check for named entity recognition (NER) to not be null and for word to be part of a noun phrase (NP)
   b. Matches where proper noun (NNP) is dominated by NP
   c. Matches where common noun (NN) is dominated by NP
   d. Strip pronoun (PRP) and determiners (DT) from the above
   e. Divide NER phrases into chunks
   f. Remove numbers from NER phrases
3. Determine, based on the rules, graph lookup queries from the result of the parses and the entity candidate list generated by entity linking technique (e.g., Dexter 2.0)
4. For the entities not matched by Dexter 2.0, make a call to the Mediawiki Webservice API
5. The returned WikiData entity IDs are cached using Redis to reduce future API calls
6. For all entities in an utterance, check for all possible combinations (e.g., N choose 2 combinations)
   a. If a link exists between any two of the entities in the utterance, add the link to the graph G

* the above step can also be performed to check for links between all the entities in the entire dataset In operation 2, as described above, a set of preprocessing rules may be applied to generate a candidate entity list. The preprocessing rules may include, for example, (a) checking for named entity recognition to not be null and for the word to be part of a noun phrase; (b) checking for matches (extracted entities) where a proper noun is dominated by NP (i.e., NP is the parent of NNP in the semantic parse tree); (c) checking for matches (extracted entities) where a common noun is dominated by NP (i.e., NP is the parent of NN in the semantic parse tree); (d) striping pronouns (PRPs) and determiners (DTs) from the above; (e) dividing NER phrases into chunks; and (f) removing numbers and dates from NER phrases. The final list after the above operations is a set of results for each of the individual rules.

In operation 3, graph lookup queries may be determined, based on the preprocessing rules described above, from results of the utterance parsing in operation 1 and a candidate entity list generated by an entity linking technique, such as the Dexter 2.0 framework described above. As used herein, entity linking may refer generally to matching an entity with the correct knowledge base entry when there are ambiguities. As an example, from the sentence "On Jul. 20, 1969, the Apollo 11 astronauts Neil Armstrong, Michael Collins, and Edwin 'Buzz' Aldrin Jr. realized President Kennedy's dream," the following graph lookup queries may be determined: "Apollo 11" (spaceflight mission), "astronauts," "Neil Armstrong" (astronaut), "Michael Collins" (astronaut), "Edwin 'Buzz' Aldrin" (astronaut), and "John F. Kennedy." In another example, from a sentence "Michael Jordan played for the Chicago Bulls," the following graph lookup queries may be determined: "Michael Jordan" (basketball player) and "Chicago Bulls." The Dexter 2 technique may also be used to link the graph lookup queries to their corresponding entries in a reference knowledge base, such as a reference knowledge graph (e.g., WikiData). For example, the Dexter 2 technique may be used to link the graph lookup queries to Wikipedia entries, and the Wikipedia entries may then be mapped to WikiData entries.

In operation 4, for each entity not matched to a reference knowledge base entry using, for example, Dexter 2.0, a call may be made to the Mediawiki Webservice API for entity linking and/or information fetching from a reference knowledge base. In some embodiments, in operation 5, the returned WikiData entity IDs may be cached, for example, using Redis, to reduce future API calls.

In operation 6, for all the entities in each utterance, all possible combinations (N choose 2 combinations) may be checked. If a link exists between two of the entities in an utterance, the link may be added to a seed graph. At the end of operation 6, a seed graph G=(V, E) may be generated, where vertices V include the set of entities identified and edges E include the links between any two of the entities. The checking for the links between two entities can also be performed for entities in the entire user dataset.

As described above, the user dataset may be small, such as about 50-100 utterances. Thus, the seed graph may only include a small number of entities, such as about 50-100 entities. In addition, the links between the entities in the seed graph may be sparse. The seed graph may need to be expanded to include additional information that is useful for a given domain, such as for a specific chatbot. According to certain embodiments, a finite state machine may be used to traverse a reference knowledge graph, such as WikiData, to identify additional information (e.g., entities and links) that may be added to the seed graph to generate the customized knowledge graph. In some embodiments, a priority queue and a priority function may be used to determine the entities and/or links to be added to the knowledge graph. In some embodiments, a simulated annealing process may be used to iteratively optimize the customized knowledge graph. One example method is described by the pseudo code shown in Table 3.

TABLE 3

Expanding seed graph

1. Initialize T ← T₀, Priority Queue (pq) ← empty
2. While T > T_{min}
   a. for component $w_g$ in Weakly Connected Components of Graph G
     (represented as WCC(G))
      1) Initialize Finite State Machine (fsm)
      2) pq_cache ← empty
      3) while fsm.state not 'end' and for each vertex w in component $w_g$
        before entity state has been visited M times:
          i. if entity is a disambiguation vertex
            move to disambiguation state;
          else if entity is a forbidden vertex
            move to forbidden state;
          else
            move to entity state → add to pq_cache
          ii. if entity state has been visited M times, move to 'end'
   b. Calculate scores for each entity e in pq_cache and insert into pq
     1) For time optimization purposes, if length(pq_cache) > N, perform
       reservoir sampling to cut the number down to N
     2) S is the scoring function $$S(G', t) = \frac{1}{Z}\mathrm{count}(WCC(G)')e^{\left(\frac{-k}{T(t)}\right)} + \eta\rho(G')\left(1 - \frac{1}{Z}e^{\left(\frac{-k}{T(t)}\right)}\right); k, \eta, Z \in \mathbb{R},$$

where k, η, and Z are real constants
     3) G' is formed by the union of G with the set of edges between (w, e)
       G' = G∪(w, e)
     4) ρ(G) is the graph density:

$$\rho(G) = \frac{|E|}{|V|(|V|-1)}, G = (V, E)$$

where G is a graph with edges E and vertices V, |E| is the number of
     edges in G, and |V| is the number of vertices in G
   c. Pop top K RDF triples off Priority Queue and add them to G
   d. Update temperature In operation 1 of the method shown by the pseudo code in Table 3, a simulated annealing process may be started by setting the initial temperature and initializing a priority queue, such as creating an empty priority queue.

In operation 2(a), each entity in each weakly connected component $w_g$ in seed graph G may be mapped to a reference knowledge graph, such as WikiData, and a finite state machine may be used to control the traversal of the reference knowledge graph from each entity in the weakly connected component $w_g$ to identify candidate entities and store them as entries in a priority queue buffer (e.g., a cache). For example, if a vertex traversed is a disambiguation vertex, the state machine may proceed to a disambiguation state; if a vertex traversed is a forbidden vertex, the state machine may proceed to a forbidden state; if a vertex traversed is an entity vertex, the state machine may proceed to an entity state; and if the entity state has been visited Mtimes for each weakly connected component $w_g$, the state machine may proceed to an "end" state. As used herein, a disambiguation vertex refers to a knowledge graph entry or knowledge base entry that distinguishes between multiple entries sharing a same or similar label. As used herein, a forbidden vertex refers to a vertex in a knowledge graph (e.g., WikiData) that either increases the sparsity of the customized knowledge graph or provides no meaningful information to the customized knowledge graph, and thus is not suitable for adding to the customized knowledge graph. The forbidden vertices may include, for example, date and/or time (e.g., duration, point in time, etc.), links to other reference knowledge base identifiers (IMDb, Freebase, etc.), Wikimedia project, article, and list pages, pages outside of the main Wikimedia knowledge tree, and duplicate and redirected entries.

Figure 6:
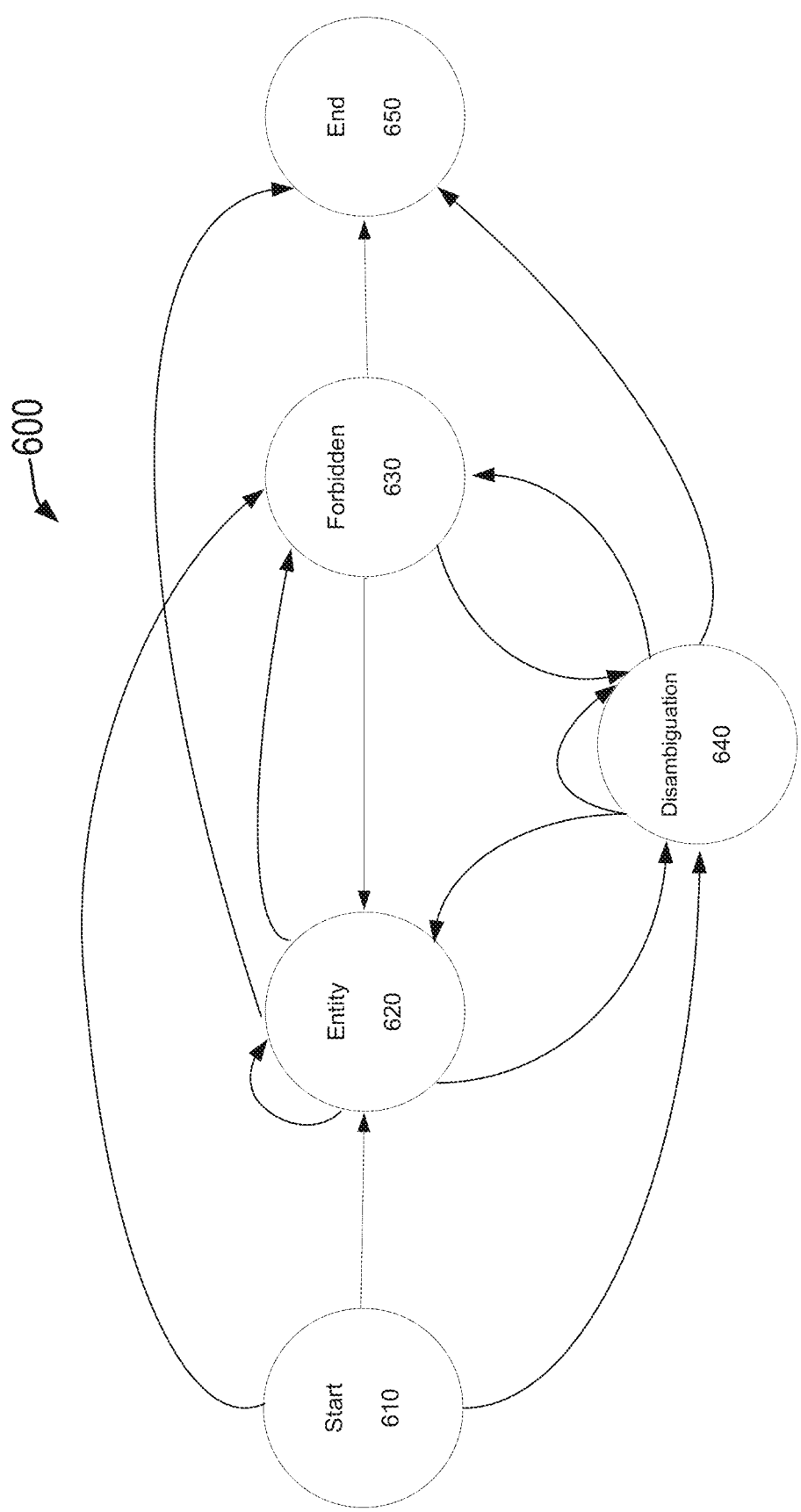
FIG. 6 illustrates an example of a finite state machine (FSM) for controlling the traversal of a reference knowledge graph according to certain embodiments.

FIG. 6 illustrates an example of a finite state machine (FSM) 600 for controlling the traversal of a reference knowledge graph in each iteration of a simulated annealing process according to certain embodiments. At a start state 610 of FSM 600, the traversal may start at a vertex in the reference knowledge graph, where the vertex may correspond to an entity w in a weakly connected component $w_g$ in a seed graph G.

If the next vertex connected to the starting vertex is a disambiguation vertex, FSM 600 may move to a disambiguation state 640. For example, disambiguation state 640 is reached whenever a disambiguation vertex in WikiData is reached. If the next vertex is not a disambiguation vertex, but is a forbidden vertex, FSM 600 may move to a forbidden state 630. Any entry in the reference knowledge graph (e.g., WikiData) that is not a disambiguation vertex or a forbidden vertex is an entity w and may cause FSM 600 to move to an entity state 620, where the Resource Description Framework (RDF) of the entity w may be added to a priority queue buffer (e.g., a cache). The RDF may be a triple in the form of, for example, subject-predicate-object. The subject may indicate a resource, the object may indicate traits or aspects of the resource, and the predicate may indicate a relation between the subject and the object.

All possible transitions between the entity, disambiguation, and forbidden states may be allowed with the exception of the transition from forbidden state 630 back to forbidden state 630 because it is undesirable to add any paths going through a forbidden vertex to the knowledge graph. Through this process, close neighboring entities of entities in the user dataset (and the seed graph) may be identified, disambiguation vertices may be used to extend the graph search, and forbidden vertices may be ignored. An end state 650 may be reached when entity state 620 has been visited Mtimes for each weakly connected component $w_g$ or when there is no other directly or indirectly linked vertices to traverse. The traversal of the reference knowledge graph in an iteration may be stopped at end state 650.

In one example, if the starting vertex has a link to a vertex "Obama" in the reference knowledge graph, FSM 600 may move from start state 610 to entity state 620, and the RDF for vertex "Obama" may be added to the priority queue buffer (e.g., pq_cache). If vertex "Obama" has 2 vertices linked to it: "America" (e.g., linked by a relation "president of") and "20 January 2009" (e.g., linked by a relation "start time"), when vertex "20 January 2009" is traversed, FSM 600 may go to forbidden state 630 because date and time vertices are forbidden vertices. The next vertex traversed is vertex "America," which is a valid entity. Therefore, FSM 600 may go to entity state 620 again and add the RDF triple for "America" to priority queue buffer pq cache. The process may repeat with vertices linked to "America" and/or other entities in the weakly connected component $w_g$ in seed graph G until entity state 620 have been visited Mtimes or when there is no other directly or indirectly linked vertices to traverse.

In operation 2(b) of Table 3, a priority score may be calculated for each entry in the priority queue buffer using a scoring function that is a function of temperature. In some embodiments, if the total number of entities that have been visited during an iteration exceeds a threshold value N, a reservoir sampling technique as described above with respect to 512 of FIG. 5 may be performed to reduce the number of entities in the priority queue buffer to N and thus reduce the computation of the priority scores. This may be done for time optimization purposes because calculating the priority scores may be more computationally expensive than knowledge graph traversal using the finite state machine.

For example, after candidate entities are identified and the corresponding RDF triples are saved to the priority queue buffer in operation 2(a) of the iteration, a priority score may be calculated for each entity e in the priority queue and the corresponding path taken to reach entity e, according to a priority function:

$$S(G', t) = \frac{1}{Z} \text{count}(WCC(G'))e^{\left(\frac{-k}{T(t)}\right)} + \eta\rho(G')\left(1 - \frac{1}{Z}e^{\left(\frac{-k}{T(t)}\right)}\right); k, \eta, Z \in \mathbb{R}, \quad (1)$$

where WCC(G') is a weakly connected component function used to identify weakly connected components in a graph; t is the current time step; T(t) is the temperature at time t; k, η, and Z are real constants; and G' is a new graph formed by the union of a graph G with the set of edges between (w, e). New graph G' can be represented by:

$$G' = G \cup (w,e) \quad (2)$$

ρ(G) corresponds to a graph density and can be determined according to:

$$\rho(G) = \frac{|E|}{|V|(|V|-1)}, G = (V, E), \quad (3)$$

where G is a graph with edges E and vertices V, |E| is the number of edges in graph G, and |V| is the number of vertices in graph G.

In operation 2(c) of Table 3, entries in the priority queue with the highest priority scores may be selected and added to seed graph G. In operation 2(d), the temperature for the simulated annealing process may be updated to initiate a new iteration of the processing in operation 2. The temperature at time step t can be determined by, for example:

$$T(t) = \alpha T(t-1), \alpha \in [0.85, 0.96] \quad (4)$$

The cooling schedule may be chosen based on the effect it has on the priority function shown in Equation (1). The priority function shown in Equation (1) may prioritize adding new vertices when the temperature is high, in order to increase the number of entities in the weakly connected components. As the system is cooled down, the priority function may place more weight on the graph density, in order to add more edges between vertices that already exist in the graph. The two parts of the priority function can be normalized by some coefficients (e.g., Z and η) so that they are of similar order of magnitude.

Figure 7:
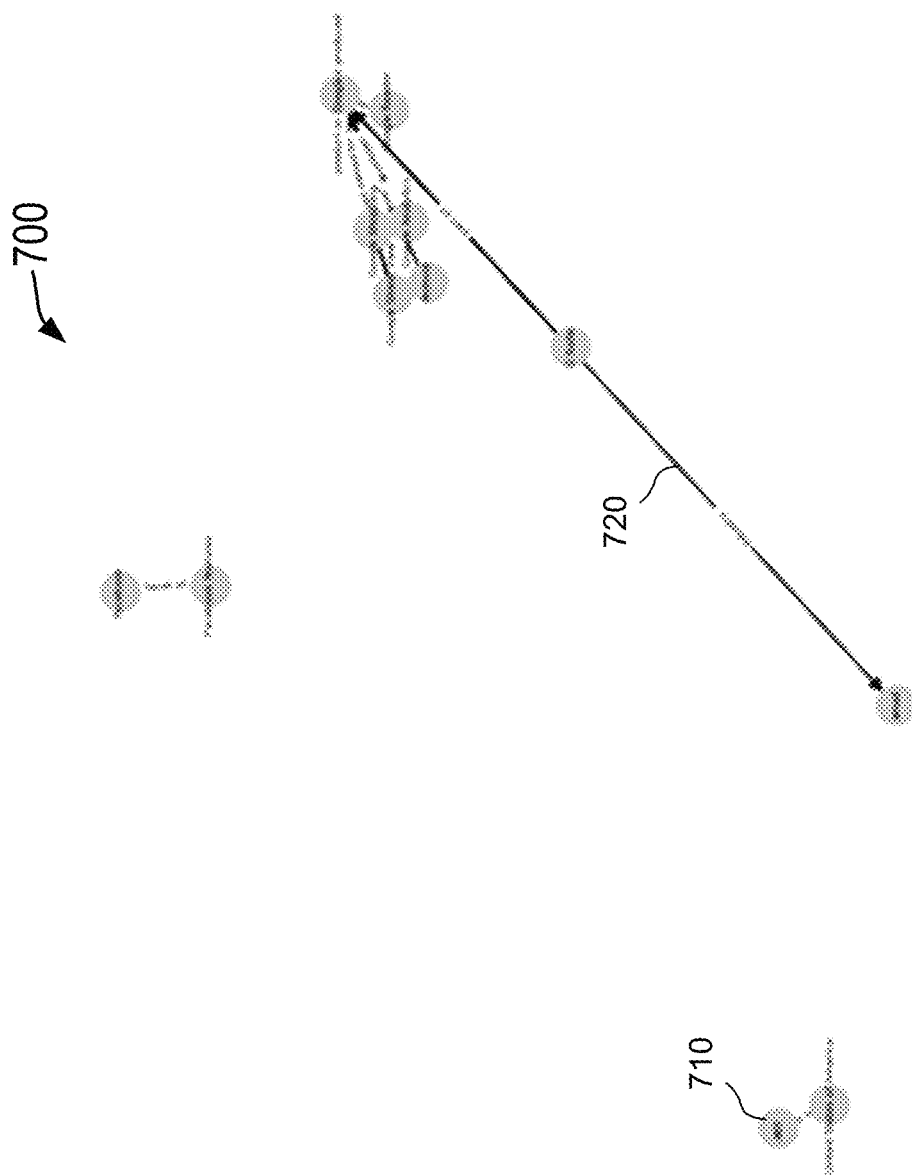
FIG. 7 illustrates an example of a seed graph generated based on a user dataset (e.g., user utterances) according to certain embodiments.

FIG. 7 illustrates an example of a seed graph 700 generated based on a user dataset (e.g., user utterances) according to certain embodiments as described above with respect to, for example, Table 2. In the example, seed graph 700 describes relations between Web Applications and their parent companies. Seed graph 700 may be based on RDF triples, such as <SoftwareA, part of, CompanyA> (converted from WikiData IDs to WikiData labels). As shown, seed graph 700 may be a sparse graph with very few entities 710 and very few links 720 between entities 710. Links 720 are labeled with the relations between entities 710. FIG. 7 is for illustration purposes only to show the sparsity of seed graph 700, and the specific content of seed graph 700 is not intended to be legible.

Figure 8:
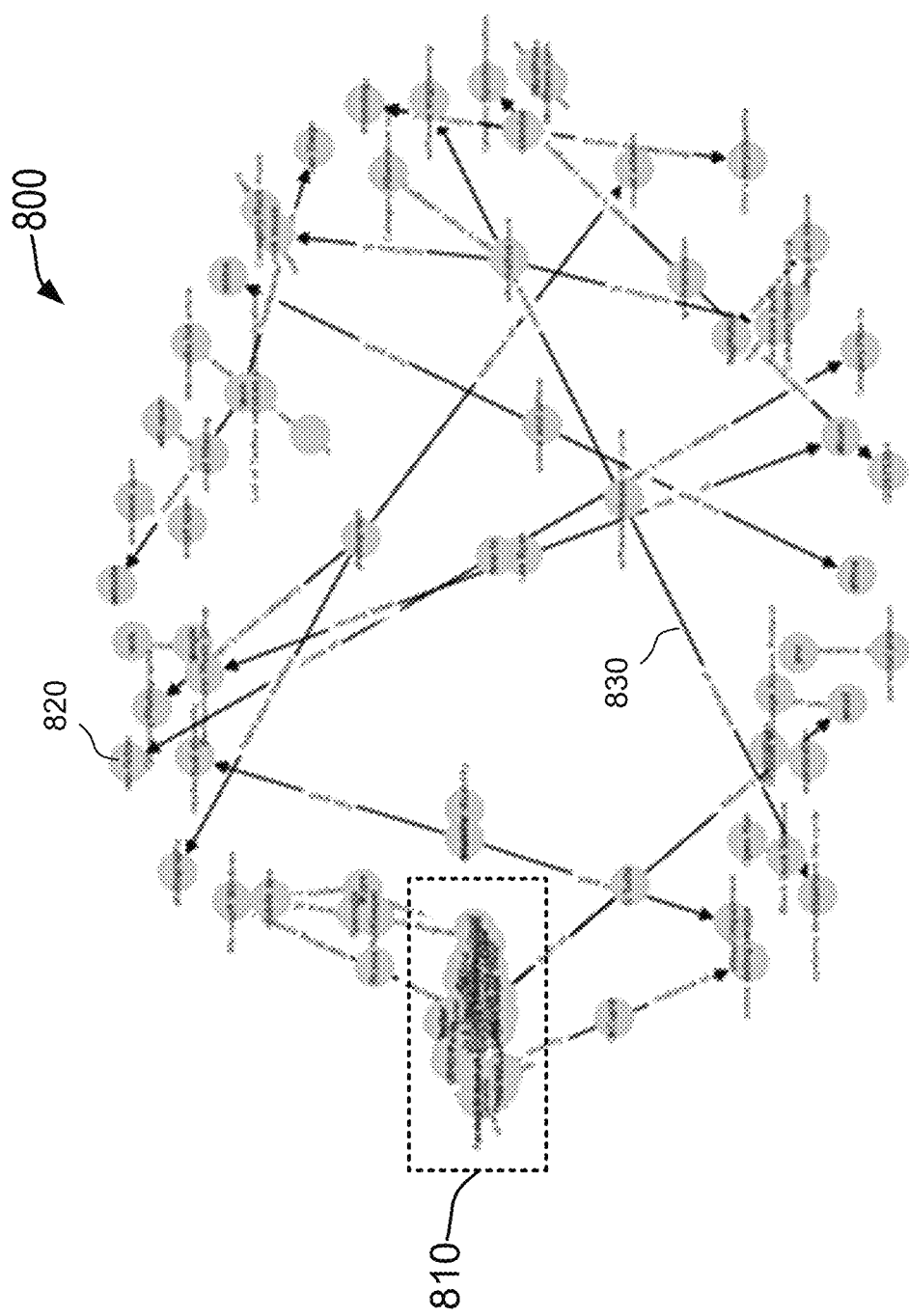
FIG. 8 illustrates an example of a customized knowledge graph generated based on the seed graph shown in FIG. 7 according to certain embodiments.
Figure 9:
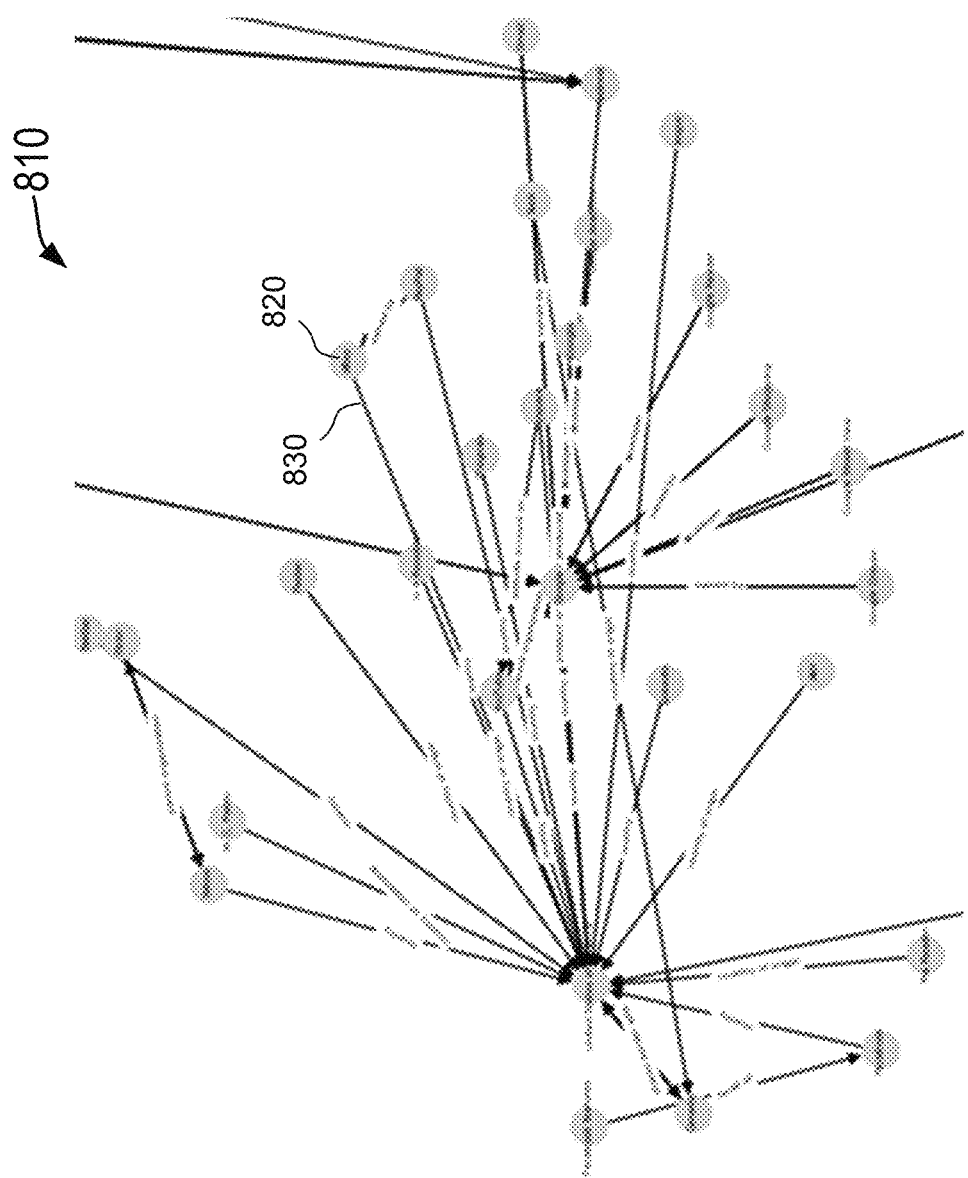
FIG. 9 is a zoom-in view of a portion of the customized knowledge graph depicted in FIG. 8.

FIG. 8 illustrates an example of a customized knowledge graph 800 generated based on seed graph 700 and techniques described above with respect to, for example, Table 3. FIG. 9 is a zoom-in view of a portion 810 in knowledge graph 800. FIGS. 8 and 9 are for illustration purposes only, and the specific content of seed graph 800 is not intended to be legible. Compared with seed graph 700, there may be much more entities 820 and links 830 between entities 820 in knowledge graph 800. Knowledge graph 800 includes various information regarding the Web Applications and surrounding concepts. Some examples include: <Internet Message Access Protocol, part of, email>, <email filtering, instance of, anti-spam>, <RunKeeper, instance of, mobile app>, <RunKeeper, operating system, Android>, and <CompanyA, country, United States of America>. Knowledge graph 800 may also include some information that may not be immediately related to the domain of the dataset, such as, for example, <alternative rock, subclass of, rock music> and <calendar, instance of, chronology>. Such information that is potentially from other domains may allow for the graph to generalize more easily when given unseen data.

Some examples of RDF triples (in the format "subject|predicate|object") that form knowledge graph 800 may include "CompanyA Street View|developer|CompanyA," "email filtering|instance of|anti-spam," "BugMeNot|instance of|service on internet," "CompanyB|country|United States of America," "CompanyC.com software engine|ProductC," "RunKeeper|operating system|Android," "RunKeeper|instance of|mobile app," "ServiceA|instance of|online dating service," "Internet Message Access Protocol|part of|email," "software release life cycle|instance of|software engineering," "CompanyD|owned by|CompanyE," "CompanyF|parent organization|CompanyG," "G Suite|industry|email," "ProductA|publisher|CompanyH," "ProductA-|developer|CompanyH," and the like.

Table 4 illustrates statistical results of examples of knowledge graphs before and after the expansion using reference knowledge graphs. The statistics include, for example, the number of vertices, the number of edges, the graph density, and the number of weakly connected components in a dataset. As show in Table 4, for datasets with a large number of starting vertices, the techniques described above may not add many new vertices, but may add many more edges. For SNIPS, the number of vertices and the number of edges increase, but the graph density decreases because SNIPS is not a limited knowledge domain dataset. For smaller seed graphs, however, a significant number of new vertices may be added. This may be because, for the larger datasets, the entities that are identified for the seed graph may locate in close proximity on the reference knowledge graph. In addition, when there are many starting vertices, it is more likely that, while traversing the reference knowledge graph, one may not discover many new vertices, but may instead discover new relations between these entities. On the other hand, for smaller datasets and thus smaller seed graphs, the technique is more likely to discover more new vertices.

TABLE 4

Graph Statistics

| Dataset | \|V\| | | \|E\| | | Graph Density | | count (WCC) | |
| --- | --- | --- | --- | --- | --- | --- | --- | --- |
| | before | after | before | after | before | after | before | after |
| SNIPS | 13116 | 15223 | 30842 | 35160 | 1.794e−04 | 1.517e−04 | 3172 | 2955 |
| WebApplication | 173 | 206 | 69 | 117 | 2.319e−03 | 2.771e−03 | 127 | 114 |
| Chatbot | 126 | 136 | 56 | 69 | 3.682e−03 | 3.758e−03 | 94 | 94 |
| AskUbuntu | 268 | 386 | 68 | 211 | 9.504e−04 | 1.420e−03 | 208 | 192 |

Knowledge graphs can be used in many applications related to natural language understanding. For example, knowledge graph embedding (KGE) techniques may embed components of a knowledge graph including entities and relations into continuous vector spaces, so as to simplify the manipulation while preserving the inherent structure of the knowledge graph. The entity and relation embeddings can then be used in, for example, knowledge graph completion, relation extraction, entity classification, entity resolution, question answering, and the like.

In general, KGE techniques represent entities and relations in a continuous vector space, and then use a distance or similarity based scoring function on each fact and other information (e.g., entity types, relation paths, textual descriptions, or logic rules) to measure its plausibility. Entity and relation embeddings can then be obtained by maximizing the total plausibility of observed facts. Knowledge graph embedding may include more semantic meaning than word vectors and can be used to augment feature representations based on word vectors. KGE may capture semantic representations of entities beyond typical word vectors by, for example, capturing the semantic meaning of multi-word tokens (e.g., phrases) and improving predictive capabilities on datasets with out-of-vocabulary (OOV) words, such as words for which there are no word vectors, in particular, in small datasets with a large number of unique and significant words.

As described above, a chatbot is a computer program or application that can conduct a conversation via auditory or textual methods by simulating how a person would behave as a conversational partner. Chatbots can be used in dialog systems for various practical purposes, including customer service or information acquisition. Some simpler chatbots may scan for keywords within the input, and then pull a reply with the best matching keywords, or the most similar wording pattern, from a database. Some chatbots may use more sophisticated natural language processing techniques to more closely simulate a person.

According to certain embodiments, knowledge graph embedding can be used for intent classification where the task may include determining by, for example, a chatbot, the action that a user wishes to perform given an input natural language utterance. A chatbot may use both word vectors and knowledge graph embeddings extracted from the customized knowledge graph generated, for example, using the method described above, to improve the performance of user intent classification.

According to certain embodiments, translational distance techniques, such as the TransE technique (see, e.g., Bordes et al., "Translating Embeddings for Modeling Multi-relational Data," Advances in Neural Information Processing Systems 26. Curran Associates, Inc., 2013, pp. 2787-2795) and its extensions, may be used to pre-train embeddings on WikiData (see, e.g., Vrandecic & Krötzsch, "Wikidata: A Free Collaborative Knowledgebase," Communications of the ACM 57:10, 2014, pp. 78-85) because the translation-based modeling technique fits the intent identification application well. TransE is an energy-based model for learning low-dimensional embeddings of entities, where relations are represented as translations in the embedding space: if (h, r, t) holds (e.g., is a proper RDF), the embedding of the tail entity t is close to the sum of the embedding of head entity h and a vector that depends on relationship r (t≈h+r); otherwise, the embedding of tail entity t is far away from the sum of the embedding of head entity h and the vector that depends on relationship r.

A KGE technique (e.g., translational distance or similarity based KGE technique) generally includes three operations: (1) representing entities and relations, (2) defining a scoring function, and (3) learning entity and relation representations. The first operation specifies the form in which entities and relations are represented in a continuous vector space. Entities are usually represented as vectors, such as deterministic points in the vector space. Relations are generally taken as operations in the vector space, which can be represented as vectors, matrices, tensors, multivariate Gaussian distributions, or mixtures of Gaussians. In the second operation, a scoring function $f_r(h, t)$ is applied to each fact (h, r, t) to measure its plausibility. For example, in TransE Techniques, the scoring function can be defined as the negative distance between h+r and t:

$$f_r(h,t) = -\|h+r-t\|_{1/2}. \tag{5}$$

Facts observed in the knowledge graph generally have higher scores than those that have not been observed. The third operation involves an optimization process that maximizes the total plausibility of observed facts to learn the entity and relation representations (e.g., embeddings).

In some embodiments, for all entities and corresponding relations in a graph G, the embeddings may first be initialized with the pre-trained embeddings and then retrained using techniques, such as the TransE technique and a different scoring function. For example, the scoring function for the retraining process may be changed from equation (5) to:

$$f_r(h,t) = -\theta_r \|h+r-t\|_{1/2}, \qquad (6)$$

where $\theta_r$ is a weight for entities and relations belonging to the generated graph. This weighted scoring function is inspired by TransM (see, e.g., M. Fan et al., "Transition-based knowledge graph embedding with relational mapping proper-ties," in Proc. 28th Pacific Asia Conf. Language Inf. Comput., 2014, pp. 328-337) and gives greater weights to entities and relations in graph G. A max-margin hinge loss function may be used following the open-world training paradigm of TransE. The embeddings can be updated with respect to a gradient of:

$$\sum_{(h,r,t)\in T} \sum_{(h',r,t')\in T'} [\gamma - f_r(h, t) + f_{r'}(h', t') + \lambda(\|r\|_2^2)]_+, \text{ or} \qquad (7)$$

$$\sum_{((h,r,t),(h',r',t'))\in T_{batch}} \max(0, \gamma - \{f_{(r)}(h + r, t) - f_{(r')}(h' + r', t')\} + \lambda(h^2 + t^2 + r^2)),$$

where $\|h\|_2 = 1$ and $\|t\|_2 = 1$. Equation (7) may include the max-margin hinge loss function, where hyperparameter $\gamma$ is the margin (>0). An additional regularization term is included in Equation (7) to prevent the entity and relation embeddings for graph G from becoming too sparse, where $\lambda$ is the regularization strength (>0). T and T' refer to the training triples and corrupted triples, respectively, in each mini-batch. This is modeled as a transfer learning process, where the retraining of the graph embeddings may serve to fine tune the vectors for the generated knowledge graph by placing a greater weight on the entities and relations present in it. This process may allow one to reduce noises in the embeddings and compensate for TransE's weakness in modeling relations that are not one-to-one, by giving preference to the constituents of the generated graph where such relations that are not one-to-one are less likely.

Table 5 shows an example of a method of using knowledge graph embeddings as described above, for example, for intent classification.

TABLE 5

Using knowledge graph embedding for intent classification

1. Use TransE to train (or use pre-trained) knowledge graph embeddings on Wikidata
2. For all entities and relations in the current knowledge graph generated from the training dataset (e.g., user dataset):
    a. Initialize the TransE algorithm with the pre-trained embeddings
    b. Retrain the embeddings using TransE but with a different scoring function
        1) Update embedding with respect to gradient of:

$$\sum_{((h,r,t),(h',r',t'))\in T_{batch}} \max(0, \gamma - (f_{(r)}(h + r, t) - f_{(r')}(h' + r', t')) + \lambda(h^2 + t^2 + r^2)),$$

where h, r, and t are the head, relation, and tail entity vectors respectively, and h', r', and t' are the corrupted head, relation, and tail entity vectors. Other variables are real constants. The scoring function is:
        $f_r(h, t) = -\theta_r \|h + r - t\|_{1/2}$,
        where the norm can be, for example, Euclidean norm. The new scoring function weighs entities in current sub-graph more heavily when calculating loss
3. Average query embeddings and combine with averaged GloVe vectors
    a. Combination may include concatenating vectors and then performing PCA on them to reduce dimensions
4. Pass the embeddings into a logistic regression model with Grid Search for hyperparameter tuning and 5-fold cross validation (e.g., 80:20 train to test split)

In the example shown in Table 5, embeddings may be pre-trained on, for example, Wikidata at operation 1. At operation 2, for all entities and corresponding relations in a knowledge graph G, the embeddings may be initialized with the pre-trained embeddings obtained at operation 1 and may then be retrained using techniques, such as the TransE technique and a different, weighted scoring function. At operation 3, for a given utterance, all entities in the utterance may be extracted using the entity extraction and linking process described above with respect to Table 2. All the entity embeddings (as calculated above) for entities in the sentence are then averaged. The sentence may also be cleaned (e.g., trimming, removing vocabulary words, removing numbers and unknown characters, etc.) in parallel to reduce sparsity, and the GloVe vectors (see, e.g., Pennington et al., "Glove: Global vectors for word representation," Proceedings of the Empirical Methods in Natural Language Processing (EMNLP), 2014) for the remaining words in the sentence may be averaged. The averaged GloVe vector for the sentence and the average knowledge graph embedding are then concatenated, and principal component analysis (PCA) can be performed on the concatenated vector as shown in, for example, Goikoetxea et al., "Single or multiple? combining word representations independently learned from text and wordnet," Proceedings of AAAI, 2016. At operation 4, the concatenated vector after the PCA may be passed to a classifier for intent classification.

Table 6 illustrates the training time and query time using the knowledge graph embedding technique and the averaged GloVe vector technique described above with respect to Table 5. The KGE training times are for first runs with no cache. Subsequent runs would be faster.

TABLE 6

Training and query time

| Dataset | No. of utterances | KGE Training Time | GloVe Training Time | KGE Query Time | GloVe Query Time |
| --- | --- | --- | --- | --- | --- |
| SNIPS | 13784 | 203 m | 344 s | 0.9 s | 0.93 s |
| WebApplication | 82 | 63 s | 82 s | 0.9 s | 0.39 s |
| AskUbuntu | 162 | 182 s | 74 s | 0.9 s | 0.37 s |

An ablation study is also performed to determine which aspects of the overall process may contribute to the gains in accuracy and F1 scores. Experiments on five variations of the technique have been conducted. In variation Var 1, no hyperparameter optimization (i.e., no grid search) is performed, and the hyperparameters are chosen randomly within a range. In variation Var 2, the knowledge graph is initialized with vertices and only edges (relations) between entities found in an input utterance. In variation Var 3, one-hop random walk traversal of the reference knowledge graph with a max depth of 5, rather than the finite state machine as described in this disclosure, is used. In variation Var 4, the feature vector is generated by averaging GloVe vectors for each word in the input utterance. In variation Var 5, knowledge graph embeddings are not retrained as described above with respect to Table 5 and TransE embeddings that were pre-trained for WikiData are used instead. The F1 scores and accuracy results for these five variations are shown in Table 7 and compared with the results achieved without applying any of these variations.

TABLE 7

Accuracy data in ablation study

| Dataset | Full Agorithm | | Var 1 | | Var 2 | | Var 3 | | Var 4 | | Var 5 | |
| --- | --- | --- | --- | --- | --- | --- | --- | --- | --- | --- | --- | --- |
| | F1 | Acc | F1 | Acc | F1 | Acc | F1 | Acc | F1 | Acc | F1 | Acc |
| SNIPS | 0.982 | 98.22% | 0.979 | 97.86% | 0.967 | 96.68% | 0.969 | 96.88% | 0.974 | 97.42% | 0.970 | 97.02% |
| WebApplication | 0.833 | 85.71% | 0.818 | 84.61% | 0.783 | 83.33% | 0.741 | 81.94% | 0.783 | 83.33% | 0.818 | 84.61% |
| Chatbot | 0.976 | 97.62% | 0.976 | 97.62% | 0.966 | 96.60% | 0.950 | 95.23% | 0.94 | 93.98% | 0.946 | 94.57% |
| AskUbuntu | 0.901 | 90.12% | 0.901 | 90.12% | 0.880 | 88.00% | 0.831 | 86.82% | 0.876 | 87.59% | 0.889 | 88.89% |

The results of the ablation study show that although hyperparameter optimization may give a minor improvement in accuracy (as shown by Var 1 vs. Full Algorithm in Table 7), it is not significant when compared to the contributions of other techniques disclosed herein. The drop in performance with random walk traversal (variation Var 3) and with averaged GloVe vectors (variation Var 4) show that the knowledge graph embeddings can capture more relevant information for the classification process. In particular, the F1 score drops more significantly than the accuracy. This may indicate that more semantic information regarding an utterance may exist within the feature vector, which may result in fewer false positives and false negatives. Both the method of initializing the knowledge graph and the method of traversing the reference knowledge graph significantly affect the results. Retraining the knowledge graph embeddings may also improve the performance, indicating that retraining the embeddings to favor the constituents of the generated knowledge graph may aid in modeling the entities and relations.

The techniques described herein may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The techniques described herein can be implemented in various different environments including a cloud environment (e.g., various types of clouds including private, public, and hybrid cloud environments), on-premises environment, a hybrid environment, and the like.

Figure 10:
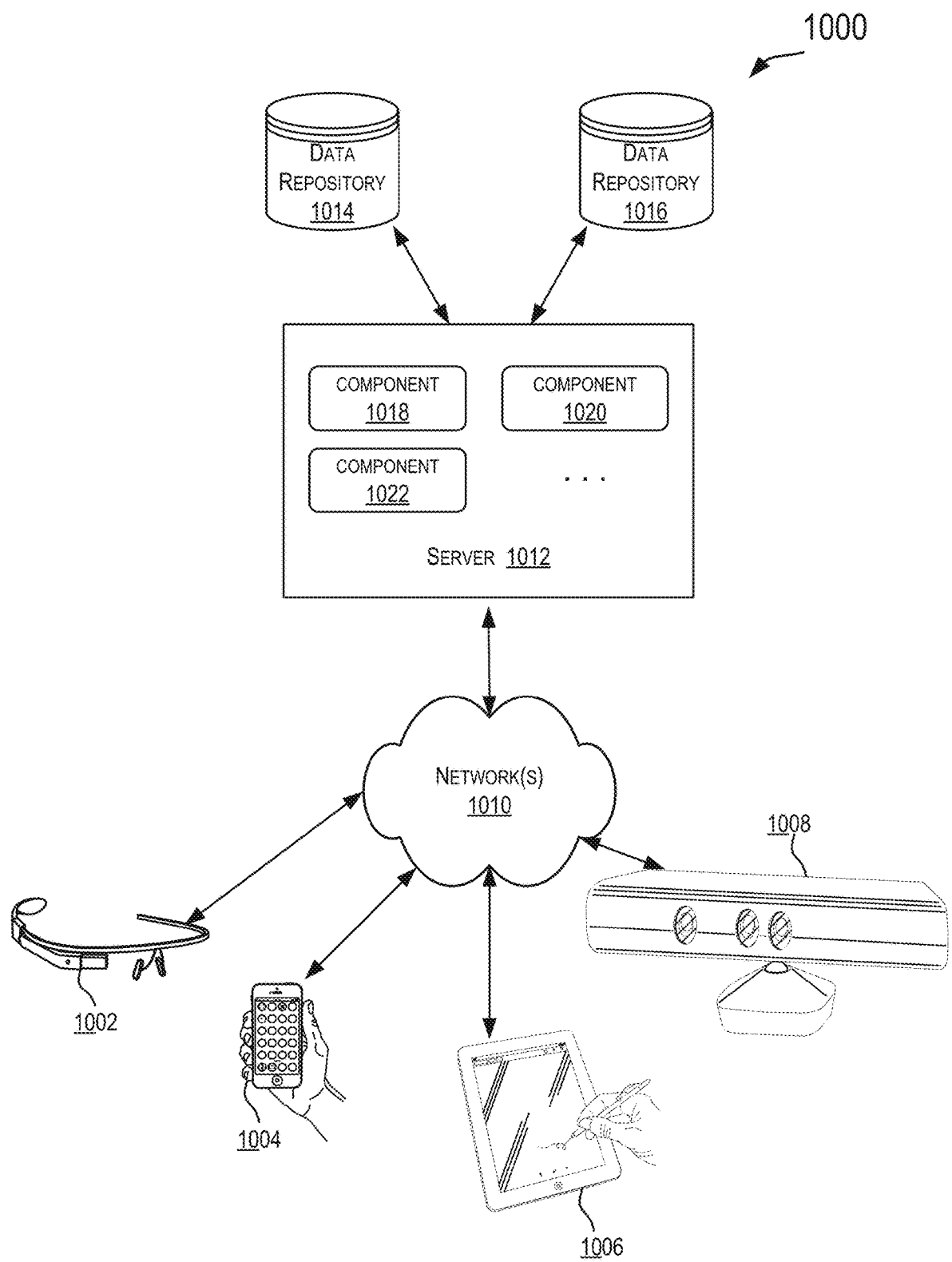
FIG. 10 depicts a simplified diagram of a distributed system for implementing certain embodiments.

FIG. 10 depicts a simplified diagram of a distributed system 1000 for implementing an embodiment. In the illustrated embodiment, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various embodiments, server 1012 may be adapted to run or provide one or more services or software applications that enable relations or mappings to be automatically generated between user interface components in an application and data objects using requirements information for the application. For example, in certain embodiments, server 1012 may receive requirements information for an application, where the requirements information may include a description of the desired functionalities for the application and may also include images of desired GUI for the application. Server 1012 may then use the requirements information to generate mappings between the user interface components of the application and one or more data objects.

In certain embodiments, server 1012 may also provide other services or software applications that may be provided in non-virtual and virtual environments. In some embodiments, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The embodiment shown in FIG. 10 is thus one example of a distributed system for implementing an embodiment system and is not intended to be limiting.

Users may use client computing devices 1002, 1004, 1006, and/or 1008 to provide requirements information to server 1012 and to receive information (e.g., mappings information) from server 1012 in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Communication network(s) 1010 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, communication network(s) 1010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, and the like), server farms, server clusters, or any other appropriate arrangement and/or combination. Server 1012 can include one or more virtual machines running virtual operating systems, or other computing architectures involving virtualization such as one or more flexible pools of logical storage devices that can be virtualized to maintain virtual storage devices for the server. In various embodiments, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain embodiments. For example, one or more of the data repositories 1014, 1016 may be used to store information such as requirements information for one or more applications, mappings information, and other information used by or generated by server 1012. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain embodiments, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands. The data repositories used by applications may be of different types such as, for example, a key-value store repository, an object store repository, or a general storage repository supported by a file system.

Figure 11:
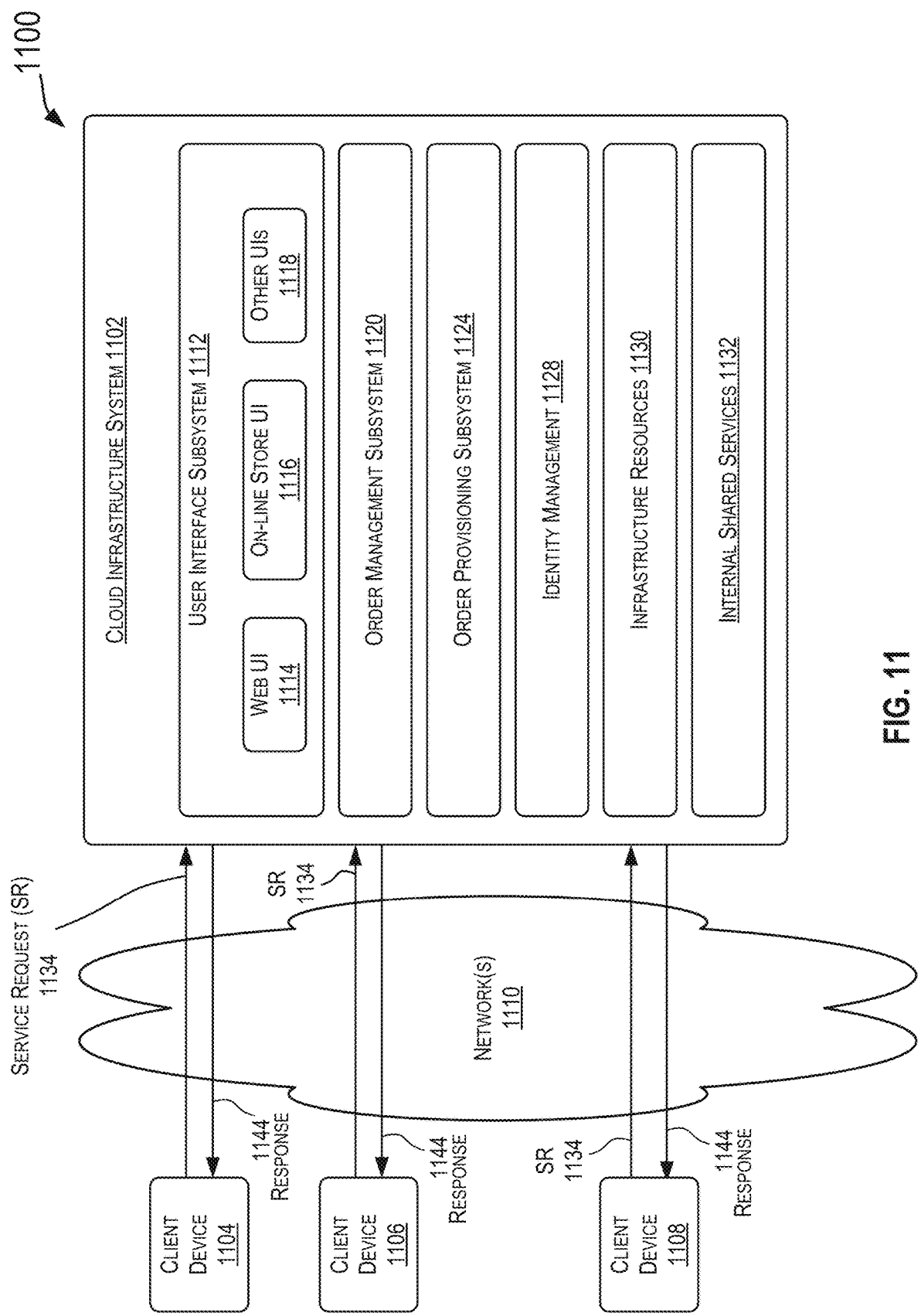
FIG. 11 is a simplified block diagram of a cloud-based system environment in which various services may be offered as cloud services, in accordance with certain embodiments.

In certain embodiments, the features described in this disclosure may be offered as services via a cloud environment. FIG. 11 is a simplified block diagram of a cloud-based system environment in which various services may be offered as cloud services, in accordance with certain embodiments. In the embodiment depicted in FIG. 11, cloud infrastructure system 1102 may provide one or more cloud services that may be requested by users using one or more client devices 1104, 1106, and 1108. Cloud infrastructure system 1102 may comprise one or more computers and/or servers that may include those described above for server 812. The computers in cloud infrastructure system 1102 may be organized as general purpose computers, specialized server computers, server farms, server clusters, or any other appropriate arrangement and/or combination.

Network(s) 1110 may facilitate communication and exchange of data between client devices 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The embodiment depicted in FIG. 11 is only one example of a cloud infrastructure system and is not intended to be limiting. It should be appreciated that, in some other embodiments, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative embodiments.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others. In certain embodiments, the ability to automatically generate a functioning application from requirements information for the application may be provided as a service under the SaaS model.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, a user may provide requirements information for an application to the cloud infrastructure system and request the cloud infrastructure system to automatically generate a functioning application from the requirements information, including automatically generating mappings between user interface components of the application and data objects, as described above. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer can be an individual or an enterprise. In certain other embodiments, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, and the like, or even individuals within the enterprise. In certain other embodiments, under a community cloud model, the cloud infrastructure system 1102 and the services provided may be shared by several organizations in a related community. Various other models such as hybrids of the above mentioned models may also be used.

Client devices 1104, 1106, and 1108 may be of different types (such as client devices 1104, 1106, and 1108 depicted in FIG. 11) and may be capable of operating one or more client applications. A user may use a client device to interact with cloud infrastructure system 1102, such as to request a service provided by cloud infrastructure system 1102. For example, a user may use a client device to provide requirements information for an application to cloud infrastructure system 1102 and request the cloud infrastructure system to automatically generate a functioning application from the requirements information, including automatically generating mappings between user interface components of the application and data objects, as described in this disclosure.

In some embodiments, the processing performed by cloud infrastructure system 1102 for providing the requested services may involve big data analysis. This analysis may involve using, analyzing, and manipulating large data sets to detect and visualize various trends, behaviors, relationships, and the like within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like.

In certain embodiments, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 by placing subscription orders using one or more of interfaces 1114, 1116, and 1118. These interfaces may include, for example, an on-line store user interface 1116 that a customer to access and browse an online store identifying cloud services offered by cloud infrastructure system 1102 and place subscription orders for one or more of the offered services that the customer wishes to subscribe to. Other interfaces may include a web interface 1114, and other interfaces 1118.

In certain embodiments, a service request or a subscription request may include information identifying the requesting user or customer and one or more services that the customer desires to subscribe to. For example, a customer may place a subscription order for an automated application generation service offered by cloud infrastructure system 1102.

In certain embodiments, such as the embodiment depicted in FIG. 11, cloud infrastructure system 1102 may comprise an order management subsystem (OMS) 1120 that is configured to process new subscription orders. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain embodiments, cloud infrastructure system 1102 comprises an identity management subsystem (IMS) 1128 that is configured to manage customers' information and provide the separation of the managed information such that information related to one customer is not accessible to or intermixed with information for another customer. IMS 1128 may be configured to provide various security-related services such as identity services, such as information access management, authentication and authorization services, services for managing customer identities and roles and related capabilities, and the like.

Figure 12:
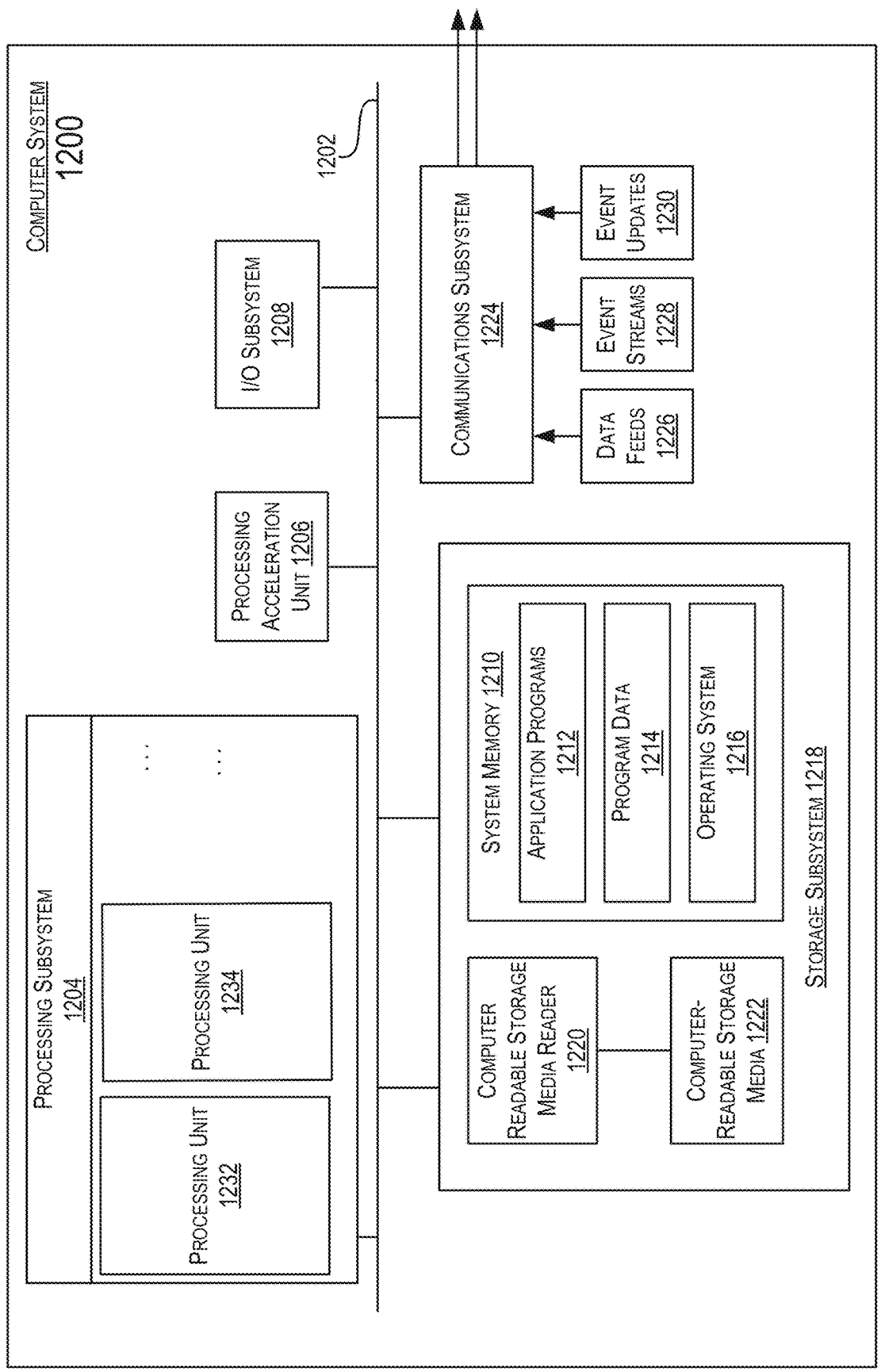
FIG. 12 illustrates an example of a computer system that may be used to implement certain embodiments.

FIG. 12 illustrates an exemplary computer system 1200 that may be used to implement certain embodiments. For example, in some embodiments, computer system 1200 may be used to implement any of the various servers and computer systems described above, such as model generation system 122 depicted in FIG. 1. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 can be organized into one or more processing units 1232, 1234, and the like. A processing unit may include one or more processors, one or more cores from the same or different processors, a combination of cores and processors, or other combinations of cores and processors. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer-readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above. In instances where computer system 1200 is executing one or more virtual machines, one or more processing units may be allocated to each virtual machine.

In certain embodiments, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, and the like. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides an example of a tangible non-transitory computer-readable storage medium for storing the basic programming and data constructs that provide the functionality of some embodiments. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide a repository for storing data used in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), and the like, program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS®, Windows® Phone, Android® OS, BlackBerry® OS, Palm® OS operating systems, and others.

Computer-readable storage media 1222 may store programming and data constructs that provide the functionality of some embodiments. Computer-readable storage media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1218 may also include a computer-readable storage media reader 1220 that can further be connected to computer-readable storage media 1222. Computer-readable storage media reader 1220 may receive and be configured to read data from a memory device such as a disk, a flash drive, and the like.

In certain embodiments, computer system 1200 may support virtualization technologies, including but not limited to virtualization of processing and memory resources. For example, computer system 1200 may provide support for executing one or more virtual machines. In certain embodiments, computer system 1200 may execute a program such as a hypervisor that facilitates the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:

receiving a user dataset for a chatbot;

extracting entities from the user dataset;

identifying links between the entities based on the user dataset;

creating, in a computer readable memory, a seed graph that represents the entities and the identified links between the entities, the seed graph containing a set of nodes and a set of edges, each node in the set of nodes representing an entity extracted from the user dataset, each edge in the set of edges connecting two nodes and representing a link between the entities represented by the two nodes;

identifying one or more weakly connected components in the seed graph, wherein each weakly connected component is a subgraph of the seed graph in which all nodes in the subgraph are reachable by traversing the edges of the subgraph through an undirected path;

for each weakly connected component in the seed graph:

mapping entities represented by nodes in the weakly connected component to vertices in a reference knowledge graph;

using the mapped vertices in the reference knowledge graph as starting points, traversing the reference knowledge graph based on a finite state machine to identify a first threshold number of vertices in the reference knowledge graph and a first threshold number of entities represented by the first threshold number of vertices; and for each entity in the first threshold number of entities, storing an entry in a buffer representing the entity, wherein the entry comprises information characterizing the entity;

performing reservoir sampling on the entries in the buffer to reduce a number of the entries in the buffer;

after performing the reservoir sampling, computing priority scores for entries in the buffer;

selecting, from the entries in the buffer, a subset of entries having the highest priority scores;

adding entities in the subset of entries and their associated links to the seed graph to generate a customized knowledge graph that is an expanded version of the seed graph;

receiving, by the chatbot, an utterance;

determining, by the chatbot, a user intent corresponding to the utterance using the customized knowledge graph; and providing, by the chatbot, a response to the utterance based upon the determined user intent.

2. The computer-implemented method of claim 1, wherein the user dataset includes a plurality of user utterances.

3. The computer-implemented method of claim 1, wherein extracting the entities and identifying the links between the entities include performing, on the user dataset, at least one of:

part-of-speech tagging;

named-entity recognition; or constituency parsing.

4. The computer-implemented method of claim 1, wherein mapping the entities in the weakly connected component to the vertices in the reference knowledge graph comprises mapping the entities to the vertices in the reference knowledge graph using Dexter 2.

5. The computer-implemented method of claim 1, wherein:

the finite state machine includes a disambiguation state, an entity state, a forbidden state, and an end state; and traversing the reference knowledge graph comprises:

when a next vertex in the reference knowledge graph is a disambiguation vertex, entering the disambiguation state;

when the next vertex in the reference knowledge graph is a forbidden vertex:

if a current state of the finite state machine is not the forbidden state, entering the forbidden state;

when the next vertex in the reference knowledge graph is an entity vertex:

entering the entity state; and saving a resource description framework (RDF) of the next vertex in the reference knowledge graph as an entry in the buffer; and when a number of entries in the buffer is greater than a second threshold number, entering the end state.

6. The computer-implemented method of claim 5, wherein the forbidden vertex includes a date, a time value, a link to another reference knowledge graph, a web page, or a duplicated or redirected entity.

7. The computer-implemented method of claim 1, wherein the priority score for an entry in the buffer is determined using a priority function that is a function of:

a number of weakly connected components in a knowledge graph including the seed graph and the entity associated with the entry;

a graph density of the knowledge graph including the seed graph and the entity associated with the entry; and a control parameter.

8. The computer-implemented method of claim 7, further comprising, after adding the entities and links identified in the subset of entries to the seed graph, updating the control parameter.

9. The computer-implemented method of claim 8, wherein updating the control parameter includes multiplying the control parameter with a value less than 1.

10. The computer-implemented method of claim 8, further comprising:

for each weakly connected component in the customized knowledge graph:

mapping entities in the weakly connected component to vertices in the reference knowledge graph;

traversing, from the mapped vertices in the reference knowledge graph and based on the finite state machine, the reference knowledge graph to identify up to the first threshold number of entities in the reference knowledge graph; and saving resource description frameworks (RDFs) for the identified entities as entries in the buffer;

computing priority scores for the entries in the buffer using the priority function and the updated control parameter;

selecting, from the entries in the buffer, a second set of entries having the highest priority scores; and adding entities and links identified by the second set of entries to the seed graph to generate an updated customized knowledge graph.

11. The computer-implemented method of claim 1, wherein the utterance is an input utterance and wherein determining a user intent corresponding to the utterance comprises:

extracting entities from the input utterance;

generating, based on the customized knowledge graph, knowledge graph embeddings for the extracted entities; and classifying the input utterance based on the knowledge graph embeddings for the extracted entities.

12. The computer-implemented method of claim 11, wherein generating the knowledge graph embeddings includes generating the knowledge graph embeddings using TransE or an extension of TransE.

13. The computer-implemented method of claim 11, wherein generating the knowledge graph embeddings includes generating the knowledge graph embeddings using TransE and a weighted scoring function.

14. The computer-implemented method of claim 11, wherein generating the knowledge graph embeddings comprises:

pretraining, using the reference knowledge graph, the knowledge graph embeddings for the entities extracted from the input utterance; and retraining, using the customized knowledge graph and the pretrained knowledge graph embeddings, the knowledge graph embeddings for the entities extracted from the input utterance.

15. The computer-implemented method of claim 11, wherein classifying the input utterance based on the knowledge graph embeddings for the extracted entities comprises:

determining an average knowledge graph embedding of the knowledge graph embeddings for the extracted entities;

determining an average global vectors for word representation (GloVe) vector of GloVe vectors for words in the input utterance; and classifying the input utterance based on the average knowledge graph embedding and the average GloVe vector.

16. The computer-implemented method of claim 15, wherein classifying the input utterance based on the average knowledge graph embedding and the average GloVe vector comprises:
- combining the average knowledge graph embedding and the average GloVe vector to generate a concatenated vector;
- performing principal component analysis on the concatenated vector; and
- classing the input utterance based on the principal component analysis.

17. The computer-implemented method of claim 15, wherein determining the average GloVe vector of GloVe vectors for words in the input utterance comprises:
- cleaning the input utterance;
- generating a GloVe vector for each word in the cleaned input utterance; and
- averaging the GloVe vector for each word in the cleaned input utterance.

18. A non-transitory computer readable medium storing a plurality of instructions executable by one or more processors, wherein the plurality of instructions, when executed by the one or more processors, cause the one or more processors to perform processing comprising:
- receiving a user dataset for a chatbot;
- extracting entities from the user dataset;
- identifying links between the entities based on the user dataset;
- creating a seed graph that represents the entities and the identified links between the entities, the seed graph containing a set of nodes and a set of edges, each node in the set of nodes representing an entity extracted from the user dataset, each edge in the set of edges connecting two nodes and representing a link between the entities represented by the two nodes;
- identifying one or more weakly connected components in the seed graph, wherein each weakly connected component is a subgraph of the seed graph in which all nodes in the subgraph are reachable by traversing the edges of the subgraph through an undirected path;
- for each weakly connected component in the seed graph:
- mapping entities represented by nodes in the weakly connected component to vertices in a reference knowledge graph;
- using the mapped vertices in the reference knowledge graph as starting points, traversing the reference knowledge graph based on a finite state machine to identify a first threshold number of vertices in the reference knowledge graph and a first threshold number of entities in the reference knowledge graph represented by the first threshold number of vertices; and
- for each entity in the first threshold number of entities, storing an entry in a buffer representing the entity, wherein the entry comprises information characterizing the entity;
- performing reservoir sampling on the entries in the buffer to reduce a number of the entries in the buffer;
- after performing the reservoir sampling, computing priority scores for entries in the buffer;
- selecting, from the entries in the buffer, a subset of entries having the highest priority scores;
- adding entities in the subset of entries and their associated links identified to the seed graph to generate an expanded version of the seed graph, wherein the chatbot thereafter:
- receives an utterance;
- determines a user intent corresponding to the utterance using the expanded version of the seed graph; and
- provides a response to the utterance based upon the determined user intent.

19. A system comprising:
- one or more processors; and
- a memory coupled to the one or more processors, the memory storing instructions, which, when executed by the one or more processors, cause the system to perform operations including:
- receiving a user dataset for a chatbot;
- extracting entities from the user dataset;
- identifying links between the entities based on the user dataset;
- creating a seed graph that represents the entities and the identified links between the entities, the seed graph containing a set of nodes and a set of edges, each node in the set of nodes representing an entity extracted from the user dataset, each edge in the set of edges connecting two nodes and representing a link between the entities represented by the two nodes;
- identifying one or more weakly connected components in the seed graph, wherein each weakly connected component is a subgraph of the seed graph in which all nodes in the subgraph are reachable by traversing the edges of the subgraph through an undirected path;
- for each weakly connected component in the seed graph:
- mapping entities represented by nodes in the weakly connected component to vertices in a reference knowledge graph;
- using the mapped vertices in the reference knowledge graph as starting points, traversing, in the reference knowledge graph based on a finite state machine to identify a threshold number of vertices in the reference knowledge graph and a threshold number of entities in the reference knowledge graph represented by the first threshold number of vertices; and
- for each entity in the threshold number of entities, storing an entry in a buffer representing the entity, wherein the entry comprises information characterizing the entity;
- performing reservoir sampling on the entries in the buffer to reduce a number of the entries in the buffer;
- after performing the reservoir sampling, computing priority scores for entries in the buffer;
- selecting, from the entries in the buffer, a subset of entries having the highest priority scores; and
- adding entities in the subset of entries and their associated links to the seed graph to generate an expanded version of the seed graph,
- wherein the expanded version of the seed graph is thereafter used by the chatbot to determine a user intent corresponding to a user utterance.

* * * * *

UNITED STATES PATENT AND TRADEMARK OFFICE
CERTIFICATE OF CORRECTION

PATENT NO. : 11,625,620 B2
APPLICATION NO. : 16/542017
DATED : April 11, 2023
INVENTOR(S) : Singaraju et al.

It is certified that error appears in the above-identified patent and that said Letters Patent is hereby corrected as shown below:

On the Title Page

On page 2, Column 1, under Other Publications, Line 46, delete "Fano." and insert -- Fang. --, therefor.

On page 2, Column 1, under Other Publications, Line 46, delete "Soundino" and insert -- Sounding --, therefor.

On page 2, Column 2, under Other Publications, Line 53, delete "at" and insert -- at: --, therefor.

On page 2, Column 2, under Other Publications, Line 65, delete "NAACL2003," and insert -- NAACL 2003, --, therefor.

In the Specification

In Column 33, Line 14, delete "$f_r(h,t) = -\theta_r \|h+r-\|_{1/2}$," and insert -- $f_r(\boldsymbol{h}, \boldsymbol{t}) = -\theta_r \|\boldsymbol{h} + \boldsymbol{r} - \boldsymbol{t}\|_{1/2}$, --, therefor.

In Column 35, Line 40, delete "Agorithm" and insert -- Algorithm --, therefor.

In Column 37, Line 46, delete "IPX (Internet packet exchange)," and insert -- IPX (Internetwork packet exchange), --, therefor.

In the Claims

In Column 52, Line 43, in Claim 19, after "the" delete "first", therefor.

Signed and Sealed this
Thirteenth Day of February, 2024

Katherine Kelly Vidal
*Director of the United States Patent and Trademark Office*